(12) United States Patent
Nishibashi et al.

(10) Patent No.: US 7,356,937 B2
(45) Date of Patent: Apr. 15, 2008

(54) METHOD FOR CALIBRATING PARALLEL KINEMATIC MECHANISM, METHOD FOR VERIFYING CALIBRATION, PROGRAM PRODUCT FOR VERIFYING CALIBRATION, METHOD FOR TAKING DATA, AND METHOD FOR TAKING CORRECTION DATA FOR SPATIAL POSTURING CORRECTION

(75) Inventors: Nobutaka Nishibashi, Sakai (JP); Kazuaki Yagi, Sakai (JP)

(73) Assignee: Shin Nippon Koki Co., Ltd. (JP)

( * ) Notice: Subject to any disclaimer, the term of this patent is extended or adjusted under 35 U.S.C. 154(b) by 11 days.

(21) Appl. No.: 11/348,931

(22) Filed: Feb. 6, 2006

(65) Prior Publication Data
US 2006/0196062 A1  Sep. 7, 2006

(30) Foreign Application Priority Data
Mar. 1, 2005  (JP)  ............................. 2005-056688

(51) Int. Cl.
*B25J 9/16* (2006.01)
*G05B 19/402* (2006.01)
*G01B 5/00* (2006.01)

(52) U.S. Cl. ........................... 33/502; 73/1.79; 700/254

(58) Field of Classification Search .................. 33/502, 33/503, 504, 505, 556, 557, 558, 573; 73/1.79, 73/1.81; 700/254; 702/94, 95
See application file for complete search history.

(56) References Cited

U.S. PATENT DOCUMENTS
5,401,128 A  3/1995  Linden et al. ............... 409/132
(Continued)

FOREIGN PATENT DOCUMENTS
DE  199 38 602  5/2001
(Continued)

OTHER PUBLICATIONS
"Kinematic Calibration on a Parallel Kinematic Machine Tool of the Stewart Platform by Circular Tests"—Ibaraki et al.—Proceeding of the 2004 American Control Conference, Boston, MA Jun. 30-Jul. 2, 2004—vol. 2, pp. 1394-1399.
(Continued)

*Primary Examiner*—R. Alexander Smith
(74) *Attorney, Agent, or Firm*—Gerald E. Hespos; Anthony J. Casella

(57) ABSTRACT

A calibration method is provided for calibrating a parallel kinematic mechanism that has an end effecter. The method includes setting an adjustment tool attached to the end effecter in predetermined postures in a reference coordinate system by taking coordinates of the posture of the adjustment tool each time the adjustment tool is placed in the posture and recording coordinates of driver shafts manipulated by a numerical control device in accordance with the inverse kinematics each time the adjustment tool is placed in the posture. The method continues by calculating kinematic parameters necessary for the kinematics of the parallel kinematic mechanism based on the taken coordinates of the postures of the driver shafts and the recorded coordinates of the driver shafts. Accordingly, it is possible to obtain accurate posture information of the end effecter and relative coordinates of the driver shafts.

14 Claims, 16 Drawing Sheets

U.S. PATENT DOCUMENTS

| | | | |
|---|---|---|---|
| 5,501,096 A * | 3/1996 | Stettner et al. | 73/1.79 |
| 5,798,828 A * | 8/1998 | Thomas et al. | 356/141.3 |
| 6,067,165 A * | 5/2000 | Matsumiya et al. | 356/401 |
| 6,205,839 B1 * | 3/2001 | Brog.ang.rdh et al. | 73/1.79 |
| 6,519,860 B1 * | 2/2003 | Bieg et al. | 33/503 |
| 6,587,802 B1 * | 7/2003 | Schroder et al. | 702/91 |
| 6,865,498 B2 * | 3/2005 | Hardesty | 702/95 |
| 6,941,192 B2 * | 9/2005 | Tang et al. | 700/254 |
| 2003/0105603 A1 * | 6/2003 | Hardesty | 702/95 |
| 2004/0163268 A1 * | 8/2004 | McMurtry et al. | 33/556 |
| 2005/0038563 A1 * | 2/2005 | Rauf et al. | 700/245 |
| 2005/0113971 A1 * | 5/2005 | Zhang et al. | 700/245 |
| 2006/0254364 A1 * | 11/2006 | Matsushita | 73/760 |

FOREIGN PATENT DOCUMENTS

| | | |
|---|---|---|
| JP | 2002-91522 | 3/2002 |
| JP | 2002096232 A * | 4/2002 |
| JP | 2003-200367 | 7/2003 |

OTHER PUBLICATIONS

"Experimental Evaluation of a Vision-based Measuring Device for Parallel Machine-tool Calibration"—Renaud et al.—Proceedings of the 2002 IEEE/RSJ Intl. Conference on Intelligent Robots and Systems, Swiss, Oct. 2002, vol. 1, pp. 1868-1873.

"Self-Calibration of Parallel Mechanisms with a Case Study on Stewart Platforms"—Zhuang—IEEE Transactions on Robotics and Automation, IEEE Inc., New York, USA—vol. 13, No. 3, Jun. 1997—pp. 387-397.

"On the Accuracy of a Steward Platform—Part II Kinematic Calibration and Compensation"—Masory et al.—Proceedingsof the Intl. Conference on Robotics and Automation Atlana, 1993—vol. 3, pp. 725-728.

* cited by examiner

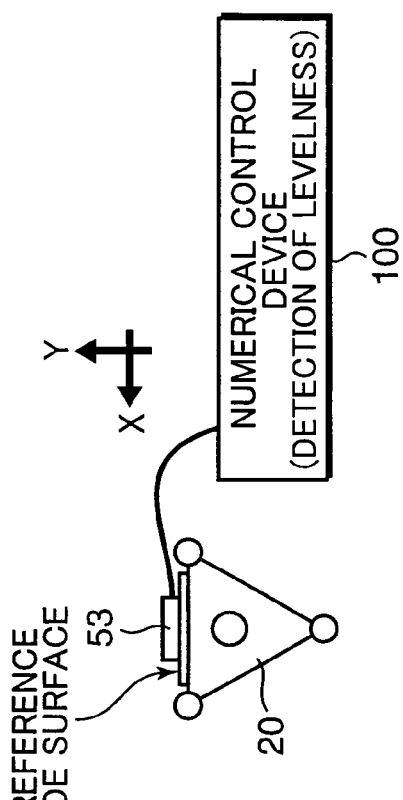
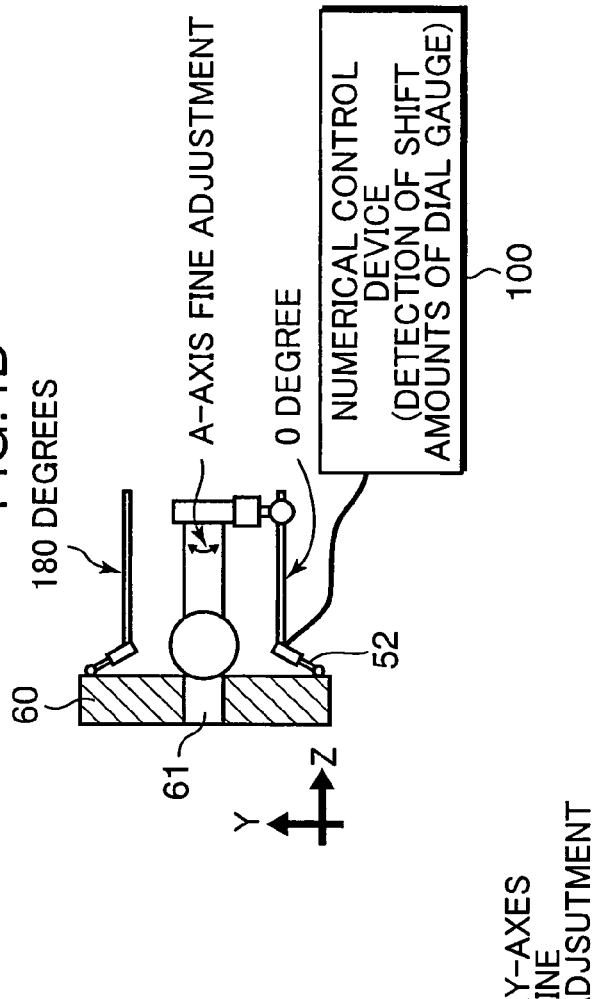
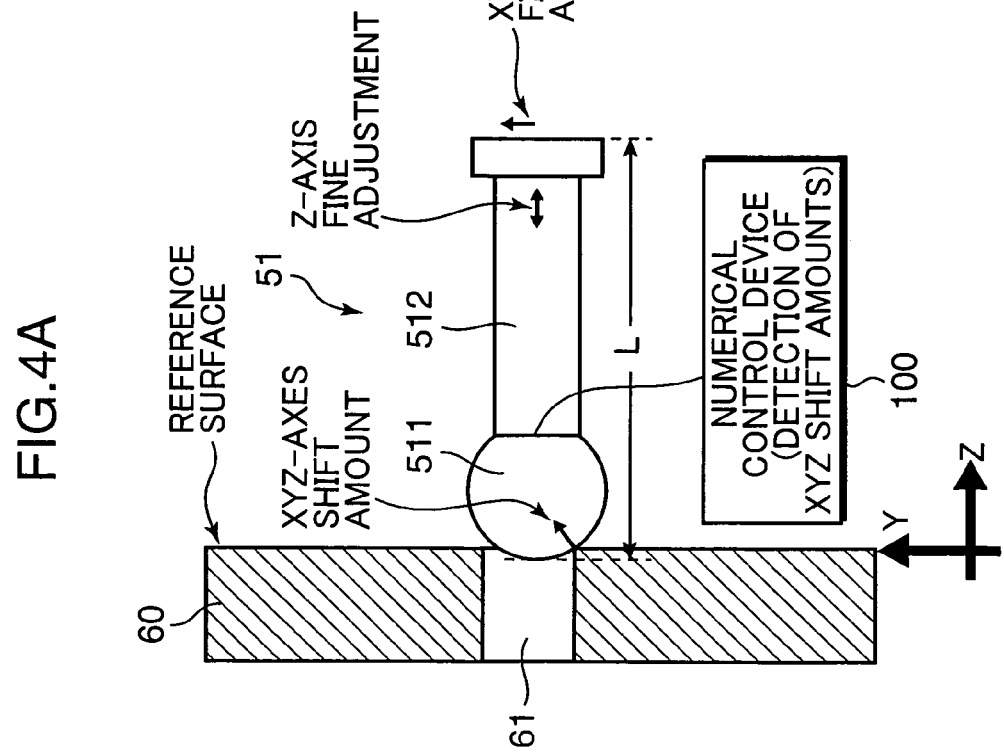

FIG.5
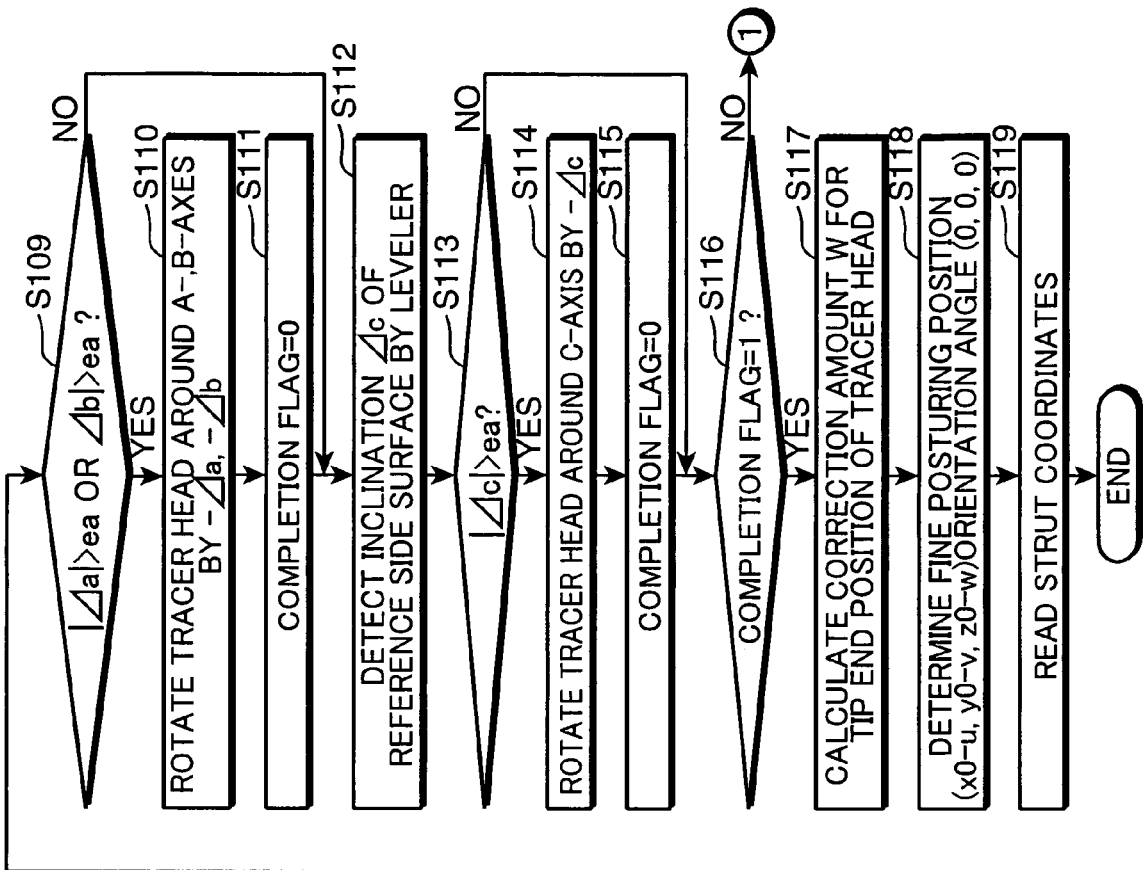
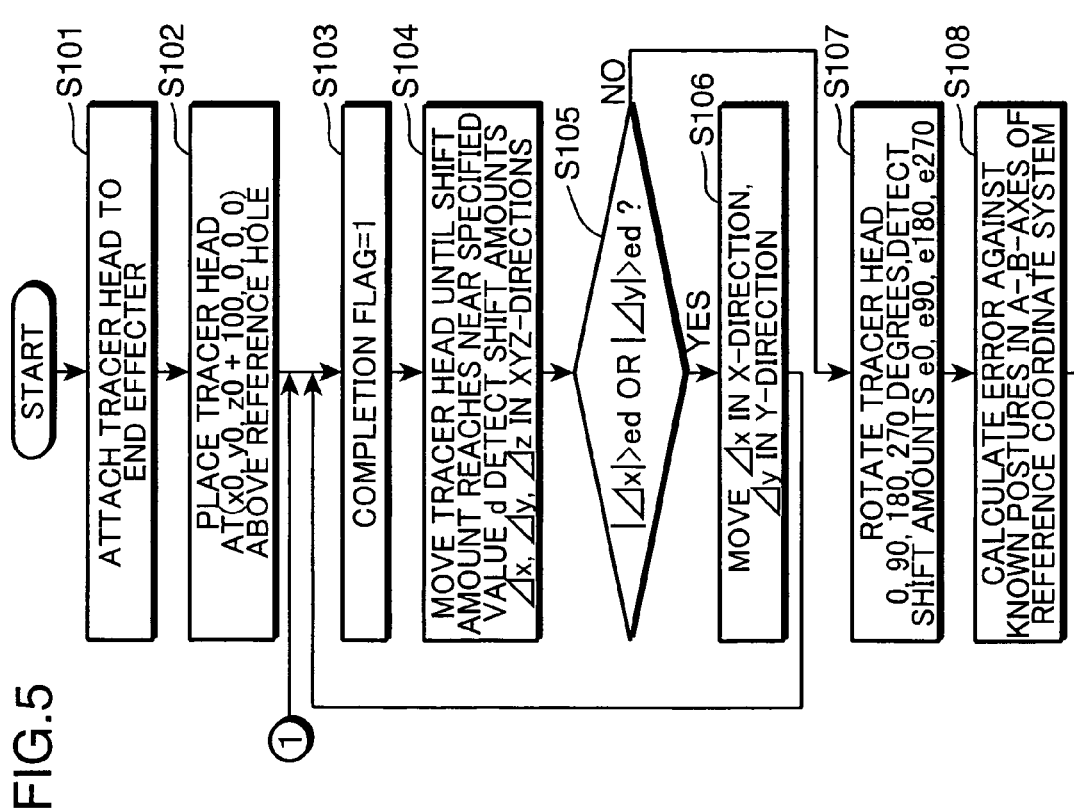

METHOD FOR CALIBRATING PARALLEL KINEMATIC MECHANISM, METHOD FOR VERIFYING CALIBRATION, PROGRAM PRODUCT FOR VERIFYING CALIBRATION, METHOD FOR TAKING DATA, AND METHOD FOR TAKING CORRECTION DATA FOR SPATIAL POSTURING CORRECTION

BACKGROUND OF THE INVENTION

1. Field of the Invention

The present invention relates to a calibration technology in a parallel kinematic mechanism which requires no measurements after posturing.

2. Description of the Related Art

A parallel kinematic mechanism which is provided with a base and an end effecter connected in parallel by a plurality of driver shafts has higher rigidity and accuracy in posturing than a mechanism which is provided with a cantilever. The Stewart platform is a typical example of the parallel kinematic mechanisms. The Stewart platform has straight driver shafts or struts which are expanded or contracted to control the posture (including a position and an orientation) of the end effecter. For the highly accurate posturing, however, it is necessary to calculate accurate kinematic parameters such as the length of a strut, coordinates of a joint connecting a strut and a base, and a joint connecting a strut and the end effecter. This operation is known as parallel kinematic mechanism calibration which is studied by various research institutes of the industry, the government, and the academy.

Generally, such calibration requires solution of multiple simultaneous equations whose number is the same as those of the parameters. To this end, it is necessary to place the end effecter in a determined position and a determined orientation, and determine position information (X, Y, Z) and orientation information (A, B, C) in the determined state.

Japanese Unexamined Patent Publication No. 2002-91522 discloses a technology whereby the end effecter is moved in a circle in a given posture, and a radial error in the locus of the circular movement is measured by a double ball bar (DBB) type of range meter, and kinematic parameters are then calculated based on thus-obtained measurement values. Also, Japanese Unexamined Patent Publication No. 2003-200367 discloses a technology that multiple simultaneous equations are separated into eleven or more equations showing relationships between the end effecter position and the kinematic parameters, and one equation showing a relationship between the end effecter orientation and the kinematic parameters, and these equations are solved to calculate kinematic parameters to execute calibration.

However, it can be seen that the former prior art documents refer to the fact that at least one kinematic parameter cannot be acquired. Also, the technology of the latter prior art document requires measurement after posturing, and in particular requires at least one measurement in the posture that involves difficult measurement.

SUMMARY OF THE INVENTION

It is an object of the present invention to provide a novel calibration technology which is free from the problems residing in the prior art.

It is an object of the present invention to provide a calibration method for a parallel kinematic mechanism, a calibration verification method, a calibration verification program product, a data taking method and a correction data taking method for spatial posturing correction which require no measurement after posturing.

According to an aspect of the present invention, a parallel kinematic mechanism which is provided with a base, an end effecter, a plurality of driver shafts connecting the base and the end effecter via a plurality of joints provided in the base and the end effecter, and a numerical control device for controlling the posture of the end effecter is calibrated by: setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter; taking coordinates of the posture of the adjustment tool each time the adjustment tool is placed in the posture; recording coordinates of each driver shaft manipulated by the numerical control device in accordance with the inverse kinematics each time the adjustment tool is placed in the posture; and calculating kinematic parameters necessary for the kinematics of the parallel kinematic mechanism based on the taken coordinates of the postures of the driver shafts and the recorded coordinates of the driver shafts.

These and other objects, features and advantages of the present invention will become more apparent upon reading of the following detailed description along with the accompanying drawings.

BRIEF DESCRIPTION OF THE DRAWINGS

FIGS. 4A to 4C are diagrams showing a data taking method performed in the parallel kinematic machine, FIG. 4A showing a positioning in the spatial coordinate system, FIG. 4B showing an orienting in the angular coordinate system, and FIG. 4C showing determining a reference position with respect to a C-axis.

FIG. 5 is a flowchart showing a sequence of operations in a first mode of data taking method.

DETAILED DESCRIPTION OF THE PREFERRED EMBODIMENTS

Figure 1:
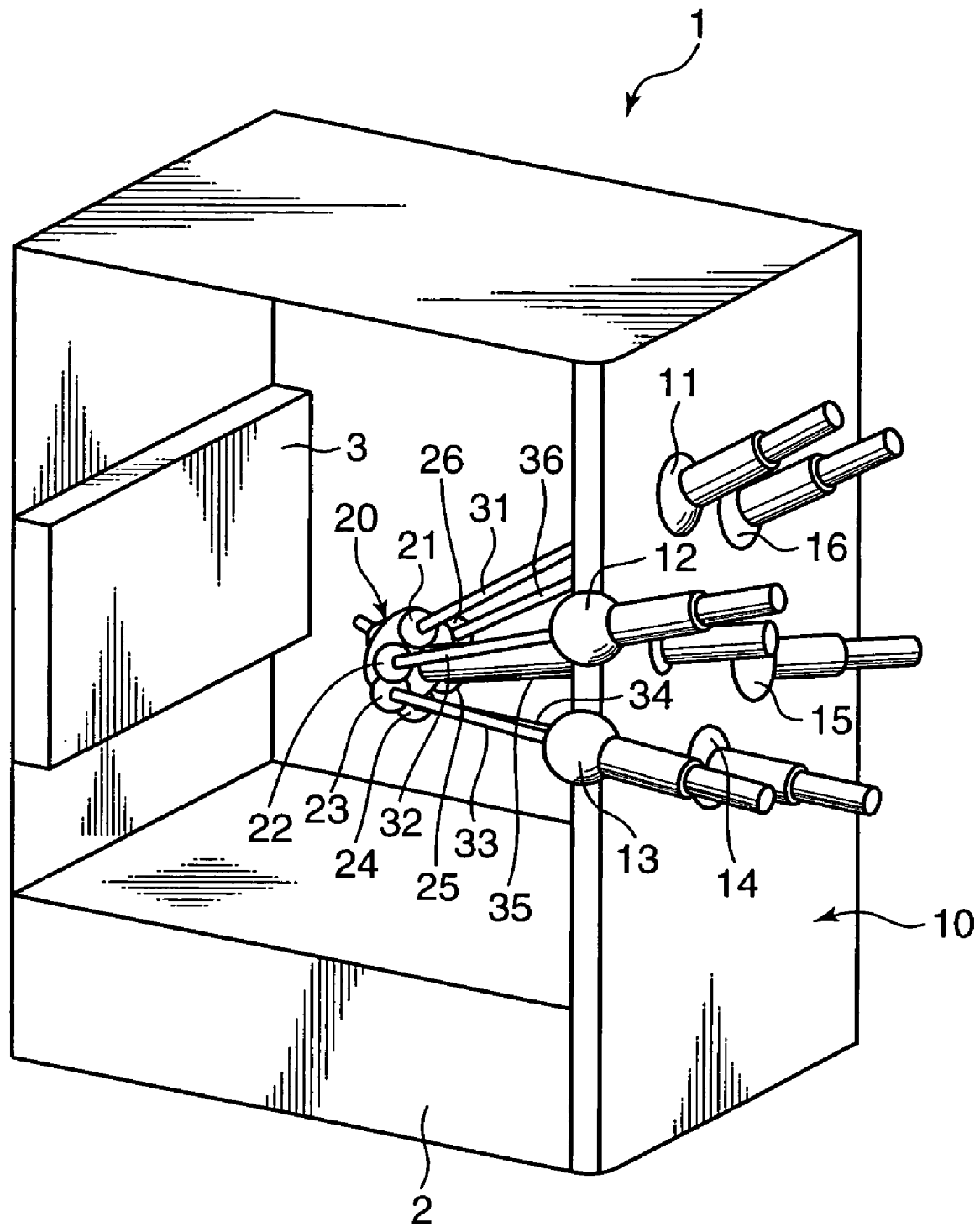
FIG. 1 is a perspective view showing a mechanical configuration of a parallel kinematic machine embodying the invention.

A preferred embodiment of the invention will be described with reference to the appended drawings. This embodiment will be described with reference to a 6×6 parallel kinematic machine which includes six joints on an end effecter and six joints on a base, more specifically, is in the form of the Stewart platform which has direct driving actuators, i.e., struts as a driver shaft. It should be noted that, in the drawings, the elements given with the same numerals or characters perform like operations, functions, and processings.

Referring to FIG. 1 showing a mechanical configuration of the parallel kinematic machine embodying the invention, the parallel kinematic machine 1 (hereinafter, referred to as "machine") includes a base 10 supported by a support platform 2 and an end effecter 20. Six joints 11 to 16 are provided in the base 10, and six joints 21 to 26 are provided in the end effecter 20. Six struts 31 to 36 are connected to the joints 11 to 16, and to the six joints 21 to 26, respectively. The struts 31 to 36 are individually expanded or contracted by a numerical control device to thereby move the end effecter 20, and to apply a specified processing to a work placed on a work holder 3. For calibration, an adjustment tool 50 is attached to the end effecter 20. The axis of the adjustment tool 50 is in agreement with an axis of the end effecter 20.

In this specification, the term "kinematics" means calculation of a posture (including a position and an orientation) of the end effecter 20 from lengths of the struts 31 to 36 in the parallel kinematic mechanism. Contrary to this, the term "inverse kinematics" means calculation of lengths of the struts 31 to 36 from a posture of the end effecter 20.

Figure 2:
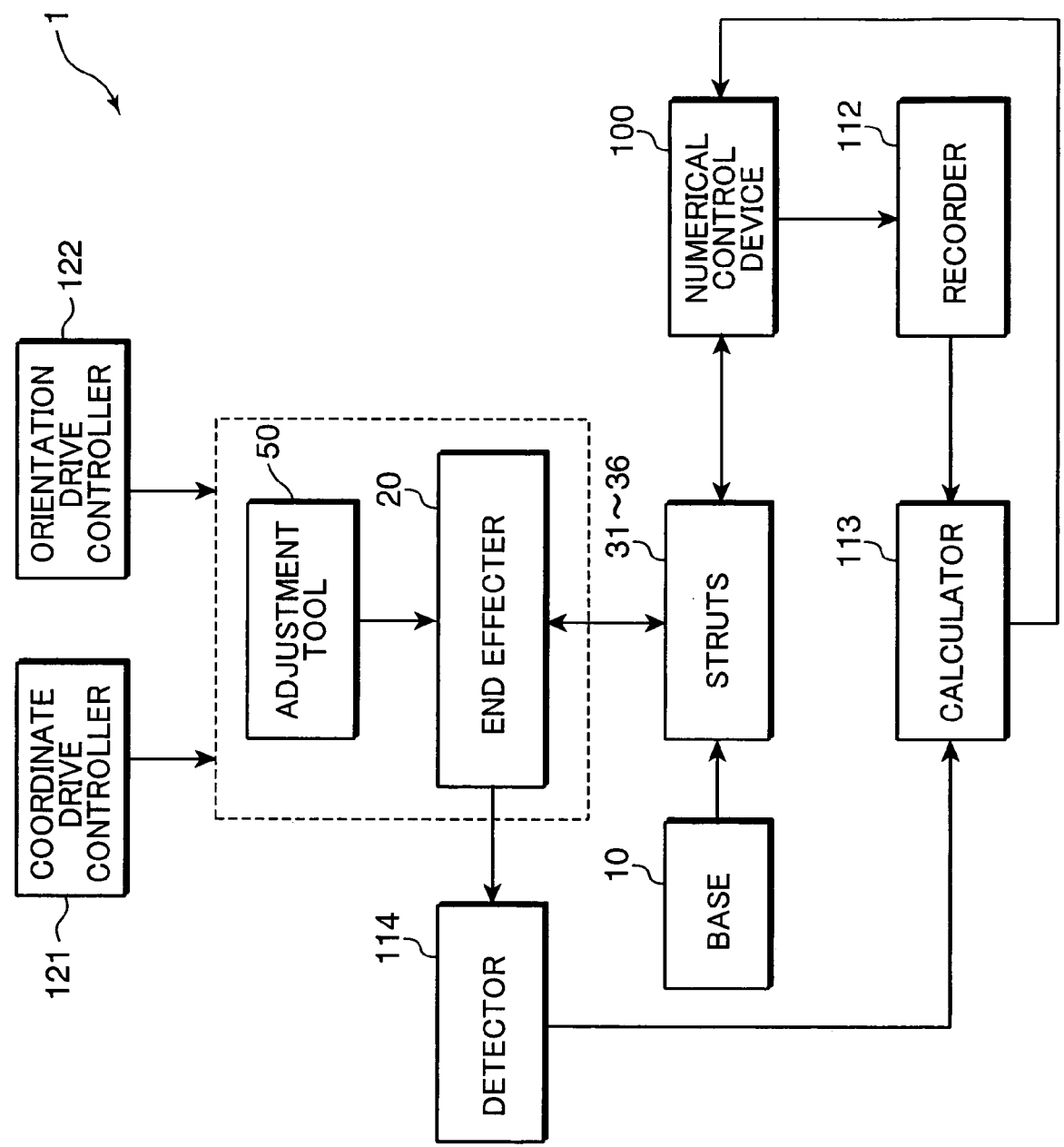
FIG. 2 is a block diagram showing a functional relationship between principal parts of the parallel kinematic machine.

FIG. 2 is a block diagram showing an overview of a functional configuration of the parallel kinematic machine according to the embodiment of the invention. Each block shown in this figure represents each processing carried out in data taking, but does not necessarily coincide with each function of the parallel kinematic machine. For instance, in the machine, a coordinate drive controller 121 and an orientation drive controller 122 are both actuated in the inverse kinematics of a numerical control device 100.

The parallel kinematic machine 1, which is provided with the base 10 supported by the support platform 2, the end effecter 20, the six struts 31 to 36 for connecting the base 10 and the end effecter, and the joints provided in the base 10 and the end effecter 20, is further provided with the numerical control device 100. The numerical control device 100 controls the posture of the end effecter 20 in accordance with the kinematics by adjusting strut coordinates (i.e., driver shaft coordinates) representing a length of each of the struts (i.e., a driver shaft) 31 to 36, and controls the strut coordinates in accordance with the inverse kinematics from the posture of the end effecter.

The coordinate drive controller 121 and the orientation drive controller 122 control the posture of the adjustment tool 50 attached to the end effecter 20 when carrying out calibration. The coordinate drive controller 121 and the orientation drive controller 122 carries out setting of the adjustment tool 50 in predetermined postures in a reference coordinate system provided outside the machine 1. In this setting, the adjustment tool 50 may be set in postures which are measurably away from a target posture in the reference coordinate system. It should be noted that the term "predetermined posture" means a posture which includes not only the target posture but also postures having measurable relative differences. A detector 114 detects a posture of the end effecter 20 when the adjustment tool 50 is set in predetermined postures.

A recorder 112 carries out recording of the strut coordinates controlled by the numerical control device 100 in accordance with the inverse kinematics when setting the adjustment tool 50 in the predetermined postures. A calculator 113 is provided with a computer, and carries out calculation of kinematic parameters necessary for the kinematics of the machine 1 based on the postures of the end effecter 20 detected by the detector 114 and the strut coordinates recorded by the recorder 112 with respect to a predetermined number of posturings which set the adjustment tool 50 in predetermined different postures. A program for causing the operations for the calibration, other necessary arithmetic equations, tables and the like are stored in a hard disk device. The numerical control device 100 controls each operation in accordance with the stored program.

Figure 3:
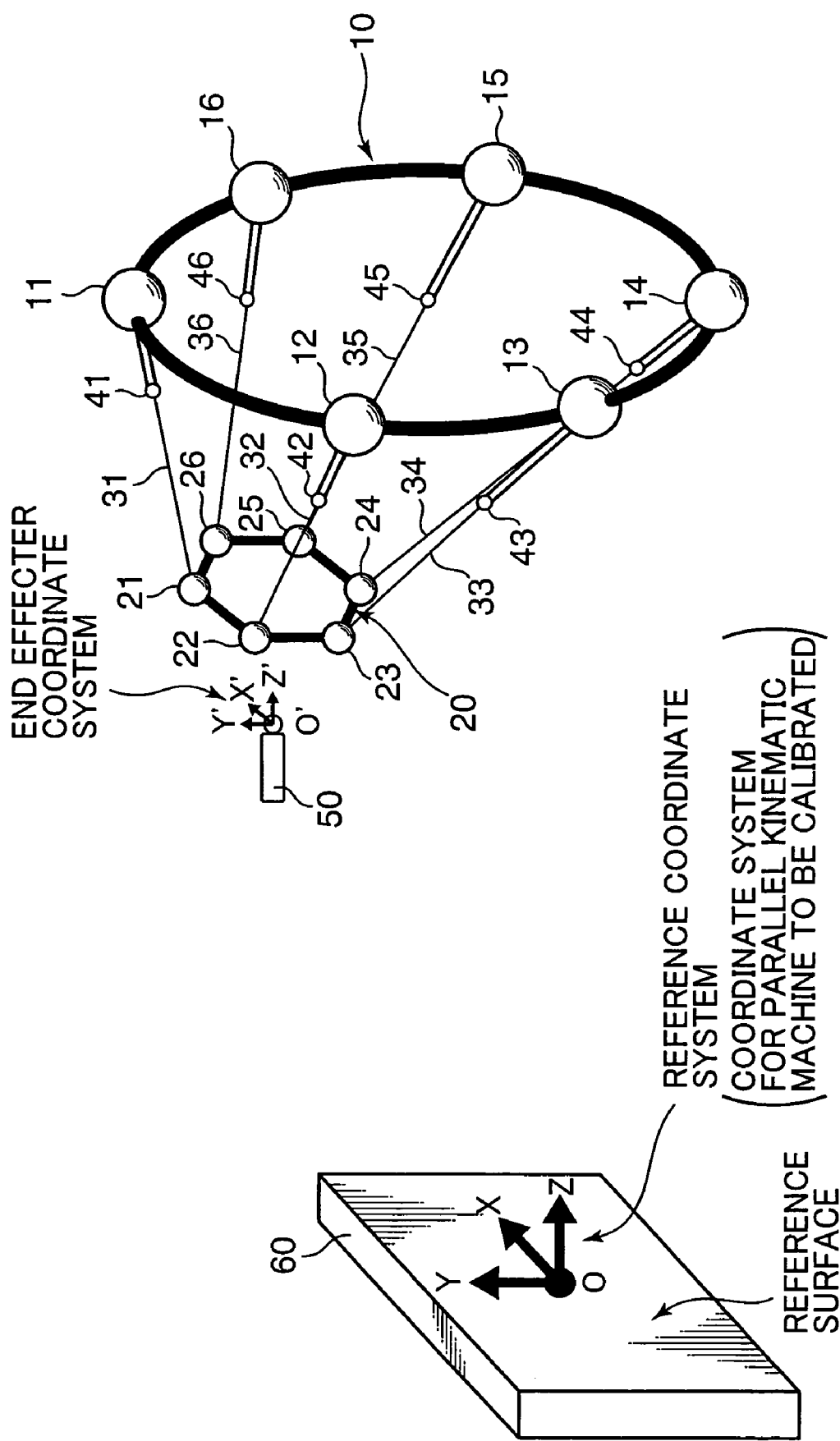
FIG. 3 is a schematic diagram showing a configuration of a 6×6 Stewart platform having 6 degrees of freedom which is adoptable in the parallel kinematic machine.

Referring to FIG. 3 schematically showing a configuration of the 6×6 Stewart platform having 6 degrees of freedom, which is adopted in the machine 1, the origin of the reference coordinate system (i.e., the origin of the reference coordinate system of the parallel kinematic machine to be calibrated) is indicated at O. Indicated at O' is the origin of an end effecter coordinate system which is a coordinate system borne on the end effecter 20. The six joints 11 to 16 provided in the base 10 are expressed by position vectors $N[j][\ ]$ ($j=1, 2, 3, 4, 5, 6$) whose starting point is the origin O of the reference coordinate system. The six joints 21 to 26 provided in the end effecter 20 are expressed by position vectors $T[j][\ ]$ ($j=1, 2, 3, 4, 5, 6$) whose starting point is the origin O' of the end effecter coordinate system. Origins 41 to 46 of the struts 31 to 36 are expressed by position vectors $O[j]$ ($j=1, 2, 3, 4, 5, 6$) whose starting point is at the joints 11 to 16 in the base 10. The position vector $O[j]$ is hereinafter referred to as "origin offset". The above-mentioned position vectors $N[j][\ ]$, $T[j][\ ]$ and $O[j]$ are kinematic parameters of the parallel kinematic machine 1.

On the other hand, the positions of the joints 21 to 26 in the postured end effecter 20 are expressed by position vectors $t[j][\ ]$ ($j=1, 2, 3, 4, 5, 6$) whose starting point is the origin O of the reference coordinate system, and respective vectors to joints 21 to 26 of the end effecter 20 from the origins 41 to 46 of the struts 31 to 36 are indicated at $s[j]$ ($j=1, 2, 3, 4, 5, 6$). It should be noted that in the case of having no mechanical error-causing factors such as gravity deformation, backlash, the distance between the position vectors $N[j]$ and $t[j]$ is identical to the sum of the vectors $s[j]$ and $o[j]$.

As mentioned above, when executing calibration, the adjustment tool 50 is attached to the end effecter 20 with the axis of the adjustment tool 50 being in agreement with the axis of the end effecter 20. The position of the tip of the adjustment tool 50 is expressed by position vectors $p[1]$, $p[2]$, and $p[3]$ (X, Y and Z coordinate values, respectively) in the reference coordinate system, and the orientation angular coordinates are shown by $p[4]$, $p[5]$ and $p[6]$ (A, B and C rotational axes, respectively). With the end effecter 20, a side surface is specified as a reference surface to determine a reference position with respect to the axis of the end effecter 20.

When carrying out a calibration, a machine table or reference board 60 is provided in the outside of the parallel kinematic machine 1. The reference board 60 has a reference coordinate system separate from the parallel kinematic machine 1. One surface of the reference board 60 is preferably made to be smooth, and is formed with a reference hole (not illustrated) having a predetermined shape at a predetermined position. The surface in which the reference hole is formed and into which the adjustment tool 50 is inserted or which faces the adjustment tool 50 is hereinafter referred to as a reference surface. In this embodiment, the posture of the end effecter 20 is fixedly held by placing the adjustment tool 50 in the vicinity of the reference hole. The reference board 60 may be configured to receive a calibration jig on the reference surface.

The reference coordinate system of the reference board 60 has a Z-axis perpendicularly intersecting the reference surface, a Y-axis extending vertically over the reference surface, an X-axis extending horizontally over the reference surface, and an origin at the position where the three axes intersect one another. The Z-axis has positive values from the origin toward the parallel kinetic machine 1, the Y-axis has positive values from the origin upwards, and the X-axis has positive values from the origin backwards, that is, this reference coordinate is a right-hand Cartesian coordinate system. Further, in a rotation around the X-axis, the X-axis is called A-rotational axis; in a rotation around the Y-axis, the Y-axis is called B-rotational axis; in a rotation around the Z-axis, the Z-axis is called C-rotational axis. A clockwise rotation about each of the A-, B-, and C-rotational axes in the positive direction has positive values.

Next, calibration of the parallel kinematic machine 1 will be described in a first mode using a tracer head and a dial gauge as the adjustment tool 50, in a second mode using a laser measuring device as the adjustment tool 50, and in a third mode using a dial gauge as the adjustment tool 50.

First Mode:

FIGS. 4A to 4C are diagrams showing a data taking manner in the first mode, FIG. 4A showing a positioning in the spatial coordinate system, FIG. 4B showing an orienting in the angular coordinate system, and FIG. 4C showing determining a reference position with respect to the C-axis. In this mode, the adjustment tool 50 has a tracer head (coordinate adjustment unit) 51 and a dial gauge (orientation adjustment unit) 52. A leveler 53 for determining a reference position with respect to the C-axis is provided on the reference side surface of the end effecter 20. In other words, for determination of a reference position with respect to the C-axis, is supposed a laterally arranged machine 1 whose base 10 has a normal perpendicularly intersecting the plumb line. The reference position with respect to the C-axis is determined so that the reference side surface of the end effecter 20 becomes horizontal. In the case of a vertically arranged machine 1, determination of a reference position with respect to the C-axis is accomplished by using a laser measurement device, etc.

In this mode, the reference board 60 is formed with a reference hole 61 in a predetermined position thereof. The reference hole 61 is formed into a cylindrical shape having an axis perpendicularly intersecting the reference surface, and a front opening and a rear opening in parallel with the reference surface. The predetermined position is known, and is indicated at coordinates (x0, y0, z0). The coordinates of the reference hole are, for instance, set at the center of the front opening of the reference hole 61. Likewise, the coordinates of the rear opening are, for instance, coordinates of the center of the rear opening. FIGS. 4A and 4B show only one reference hole 61, but a predetermined number of reference holes may be formed in other predetermined positions of the reference board 60.

The tracer head 51 has a spherical shape, and comprises a stylus 511 having a larger diameter than the reference hole 61 and a support portion 512 for supporting the stylus 511. A numerical control device 100 connected to the tracer head 51 receives a signal which is generated by a deformation of the stylus 511, and calculates shift amounts in the X, Y and Z directions based on the signal. The dial gauge 52 is attached to the support portion 512 of the tracer head 51, and measures a relative difference between distances to the reference surface of the reference board 60 when the tracer head 51 is rotated around the axis thereof.

FIG. 5 is a flowchart showing a flow of data taking operations in the first mode. The tracer head 51 is attached to the end effecter 20 with the axis of the tracer head 51 being in agreement with the axis of the end effecter 20, and the 5-axis translation function at a tool length L of the numerical control device 100 is turned on (Step S101). The 5-axis translation function is a technology that controls the orientation of the end effecter 20 at a tip end of a tool having a length L, and is called the tool tip control function. This technology is established for the general 5-axis machine. Subsequently, the tracer head 51 is placed at a position (x0, y0, z0+100, 0, 0, 0) near the reference hole 61 (Step S102). Hereinafter, the length is expressed at the unit of mm (millimeter).

A completion flag is set at "1" (Step S103), and the tracer head 51 is moved in the negative direction of the Z-axis until the shift amount comes near a specified value d, and shift amounts $\Delta x$, $\Delta y$, and $\Delta z$ in the X, Y and Z directions are detected based on a deformation of the stylus 511 (Step S104). If the shift amount |$\Delta x$| or |$\Delta y$| is larger than ed which denotes an allowable shift amount in the X and Y directions (YES in Step S105), the tracer head 51 is moved a shift amount $\Delta x$ in the X direction and a shift amount $\Delta y$ in the Y direction (Step S106). Thereafter, the flow returns to Step S103.

On the other hand, if the both shift amounts $\Delta x$ and $\Delta y$ are equal or less than ed (NO in Step S105), the positioning in the spatial coordinate system is judged to be completed, and the flow advances to the orienting in the angular coordinate system. The positioning in the spatial coordinate system is carried out in accordance with control of a coordinate drive controller 121.

In orienting in the angular coordinate system, the tracer head 51 is sequentially rotated 0, 90, 180, and 270 degrees around the axis thereof to detect a shift amount of the dial gauge 52 at each rotational position (Step S107). Assuming the respective shift amounts to be e0, e90, e180, and e270, differences $\Delta a$ and $\Delta b$ of the A-axis and the B-axis against known orientations in the reference coordinate system can be calculated by the following Equations (1) and (2) (Step S108).

$$\Delta a = \tan^{-1}(e0 - e180) \times 180/\pi \quad (1)$$

$$\Delta b = \tan^{-1}(e270 - e90) \times 180/\pi \quad (2)$$

wherein $\tan^{-1}$ denotes an inverse function of a tangent (tan). If difference |$\Delta a$| or |$\Delta b$| calculated by Equations (1) and (2) are larger than ea which denotes an allowable orientation angle around the A-axis or the B-axis (YES in Step S109), the tracer head 51 is rotated −Δa around the A-axis and −Δb around the B-axis (Step S110), and the completion flag is set at "0" (Step S111). In other words, the operations of Steps S107 to S110 are executed to adjust the relative relationship between the reference board 60 and the tracer head 51 (i.e., adjustment tool 50) so that the rotational plane of the tracer head 51 becomes parallel with the reference surface of the reference board 60. Consequently, two orientation angular coordinates representing an inclination of the axis of the tracer head 51 (i.e., adjustment tool 50) are obtained.

On the other hand, if differences |Δa| and |Δb| calculated by Equations (1) and (2) are equal or less than ea (NO in Step S109), the posturing with respect to the A-axis and the B-axis is judged to be completed, the flow advances to the posturing with respect to the C-axis. It should be noted that the sign (i.e., + or −) given to the difference Δa or Δb in Step S110 changes with a change in the attachment direction of the dial gauge 52.

In the posturing with respect to the C-axis, first, an inclination Δc of the reference side surface is detected by the leveler 53 placed on the reference side surface of the end effecter 20 (Step S112). If the inclination |Δc| is larger than ea (YES in Step S113), the tracer head 51 is rotated −Δc around the C-axis (Step S114), and the completion flag is set at "0" (Step S115). On the other hand, if the inclination |Δc| is equal or less than ea (NO in Step S113), the completion flag is held at "1".

In Step S116, it is judged whether the completion flag is "1" or not. If the completion flag is judged to be "0" (NO in Step S116), the flow returns to Step S103 because the operations at Step S111 and/or S115 are skipped, in other words, the posturing with respect to the A-axis, B-axis, or C-axis has not been completed. However, if the completion flag is judged to be "1" (YES in Step S116), all the posturings with respect to the X-axis, Y-axis, Z-axis, A-axis, B-axis, and C-axis are judged to be completed. The orienting in the angular coordinate system is carried out by an orientation drive controller 122.

Next, the fine posturing position is determined. Specifically, a correction amount w for the tip position of the tracer head 51 is calculated as Equation (3) (Step S117).

$$w = \Delta z + R - \sqrt{R^2 - r^2} \qquad (3)$$

wherein R denotes a radius of the stylus 511 of the tracer head, r denotes a radius of the reference hole 61. In this way, the fine posturing position (x0−u, y0−v, z0−w) is obtained, wherein u and v respectively denote deviations of the center of the stylus 511 against the main axis of the tracer head 51 in the X and Y directions. Also, the orientation angle is set to (0, 0, 0) (Step S118). After the fine posturing position and orientation angle are determined, strut coordinates which are displayed on the numerical control device 100 are read (Step S119). Consequently, the data necessary for calculating kinematic parameters of the machine 1 is completely obtained.

Figure 6:
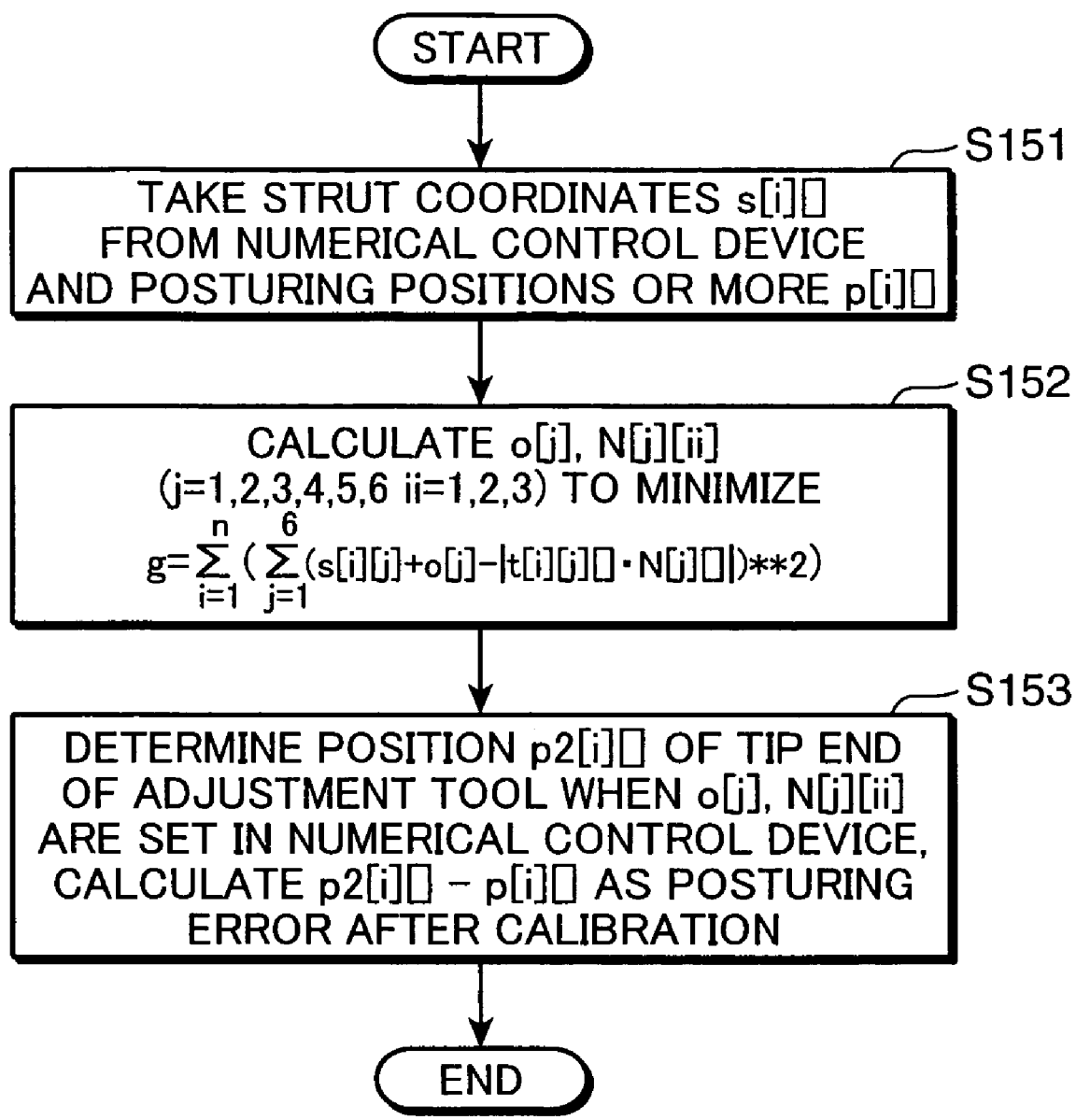
FIG. 6 is a flowchart showing a sequence of a calibration executed in the parallel kinematic machine.

Next, description is made about calibration of the machine 1 using the data obtained in the above-described way. FIG. 6 is a flowchart showing a flow of the calibration according to this embodiment. In Step S151, first, the posturing coordinate p[i][ ], i.e., the data obtained in Step S118, and the strut coordinate s[i][ ], i.e., the data obtained from the numerical control device 100 in Step S119, are taken in the flow shown in FIG. 5. It should be noted that the brackets [ ] are placed with one of numbers 1 to 6, and [1], [2], and [3] represent the Y-, X-, and Z-coordinates (i.e., spatial position coordinates) respectively, and [4], [5], and [6] represent the A-, B-, and C-coordinates (i.e., orientation angular coordinates) respectively, and "i" of [i] denotes integer or i=1, 2, 3, . . . , n, wherein "n" denotes the number of necessary data sets.

For instance, in the case of the 6×6 Stewart platform, 42 coordinate data are required: eighteen data (3×6, 3 mean X-, Y-, Z-coordinates) to specify the positions of the six joints in the end effecter 20; eighteen data (3×6) to specify the positions of the six joints in the base 10; six data to specify origin offsets for the six struts. Accordingly, when one posture is taken, equations for the six struts are obtained. Accordingly, seven or more sets of data are required. In the case of measuring the positions of the joints in the end effecter 20 by a three-dimensional measuring device, a total of twenty four data are required. Accordingly, in this case, four or more data sets are required.

In Step S152, subsequently, the origin offsets o[j] of the struts that minimize Equation (4), positions N[j][ii] of the joints in the base 10, and positions T[j][ii] of the joints in the end effecter 20 are calculated, for example, by the Newton-Raphson method, etc.

$$g = \sum_{i=1}^{n}\left(\sum_{j=1}^{6}(s\ [i][j] + o\ [j] - |t\ [i][j][\ ] \cdot N\ [j][\ ]|)^2\right) \qquad (4)$$

wherein: t[i][i][ii]=p[i][ii]+T[j][1]×m[i][1][ii]+T[j][2]×m[i][2][ii]+T[j][3]×m[i][3][ii]. The term "m[][][]" represents a matrix showing the orientation of the end effecter 20. In other words, m[i][1][ii] (ii=1, 2, 3) means an X-axis cosine in the end effecter reference coordinate system fixed to the end effecter in an orientation of a posture p[i][ ] of the i-th data. Similarly, m[i][2][ii] and m[i][3][ii] mean a Y-axis cosine and a Z-axis cosine, respectively. These coordinates can be calculated from the posture p[i][i] of the taken data.

In the case where the positions T[j][ii] of the joints in the end effecter 20 are measured by a three-dimensional measuring device, the origin offsets o[j] of the struts that minimize Equation (4) and the positions N[j][ii] of the joints of the base 10 are calculated. The Newton-Raphson method requires a default value. In this case, kinematic parameters having been instantly set in the numerical control device 100 may be adopted as the default value.

Equation 4 is based on the fact that under the condition of no mechanical error factors such as gravitational deformation and backlash, a difference between N[j] and t[j] and a sum of s[j] and o[j] are equal because the both are the length of the struts. In other words, it is sufficient to calculate kinematic parameters that minimize Equation (4) expressing a sum of squares of differences between strut coordinates defined by the following Equations (5) and (6) and distances from the joints in the base 10 to the joints in the end effecter 20.

$$l1 = s[i][j] + o[j] \qquad (5)$$

$$l2 = |t[i][\ ] \cdot N[i][\ ]| \qquad (6)$$

Accordingly, it is possible to replace the calibration algorithm conventionally considered to be complicated with a simple minimum value calculation. In other words, in place of the complicated conventional technique, calibration can be accomplished by calculating kinematic parameters that minimize Equation (4) about all the struts based on the taken data.

In Step S153 is executed an operation of generating a numerical model of a Stewart platform having the origin offset o[j], the positions N[j][ii] of the joints of the base 10, and the position T[j][ii] of the joints of the end effecter 20 calculated in Step S153, and calculating a position p2[1][ ] of the tip end of the adjustment tool 50 corresponding to the strut coordinates s[i][ ] by using the kinematics of the numerical model, and calculating a difference between p2[i][ ] and p[i][ ] as a posturing error or a correction value. If the number of the taken data is larger than the necessary number and there is an irregular gravitational deformation, the thus calculated posturing error shows a value which cannot be ignored. In this case, correction or compensation is performed using the function of spatial posturing correction or space error compensation.

Figure 7:
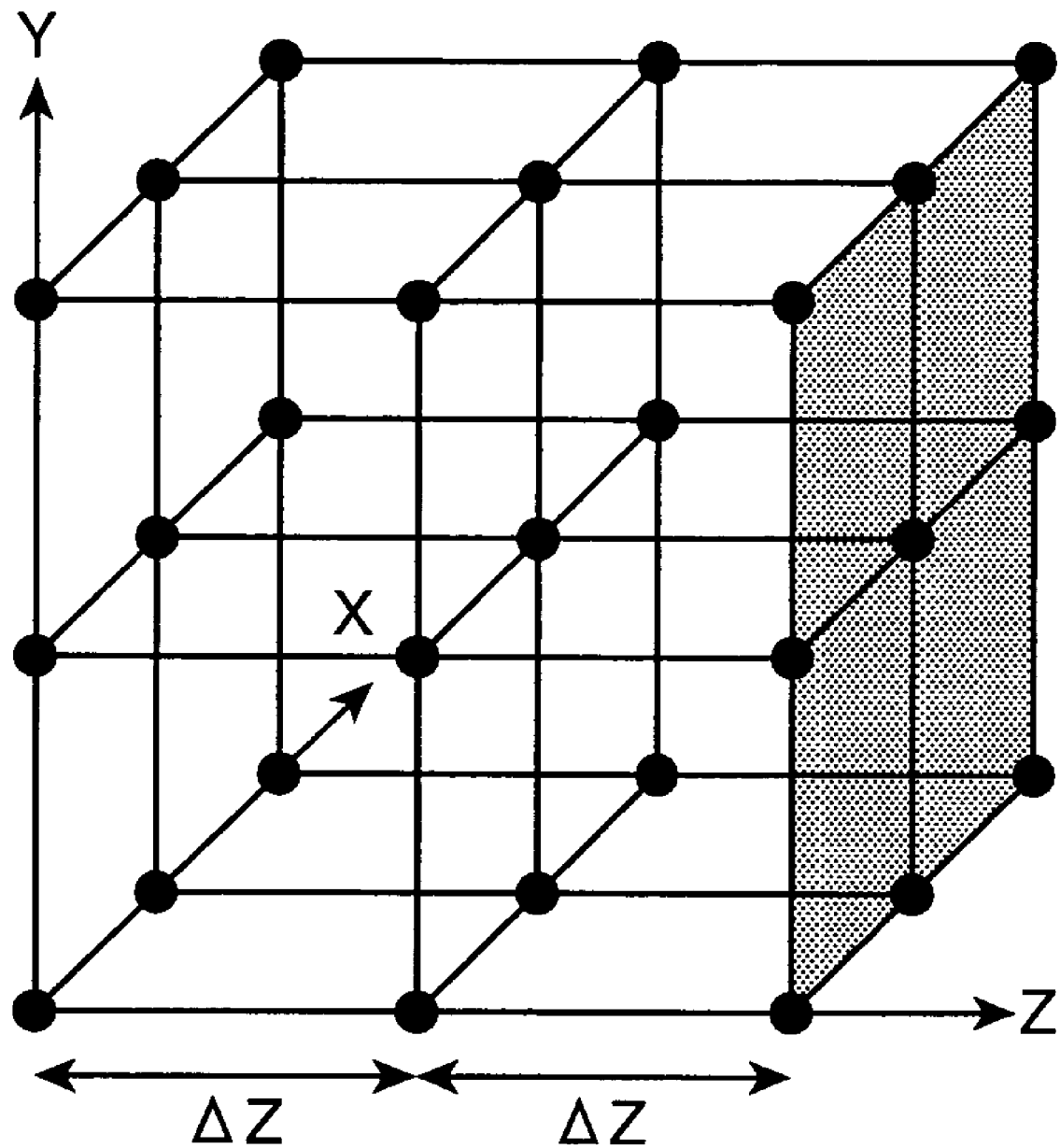
FIG. 7 is a diagram showing a spatial posturing correction executed in the parallel kinematic machine.

FIG. 7 is a diagram showing a workable space within a movable space of the machine 1 to describe the spatial posturing correction procedure. The lattice points indicated at black balls in the diagram represent known posturing positions. A correction value is registered for each lattice point.

Figure 8:
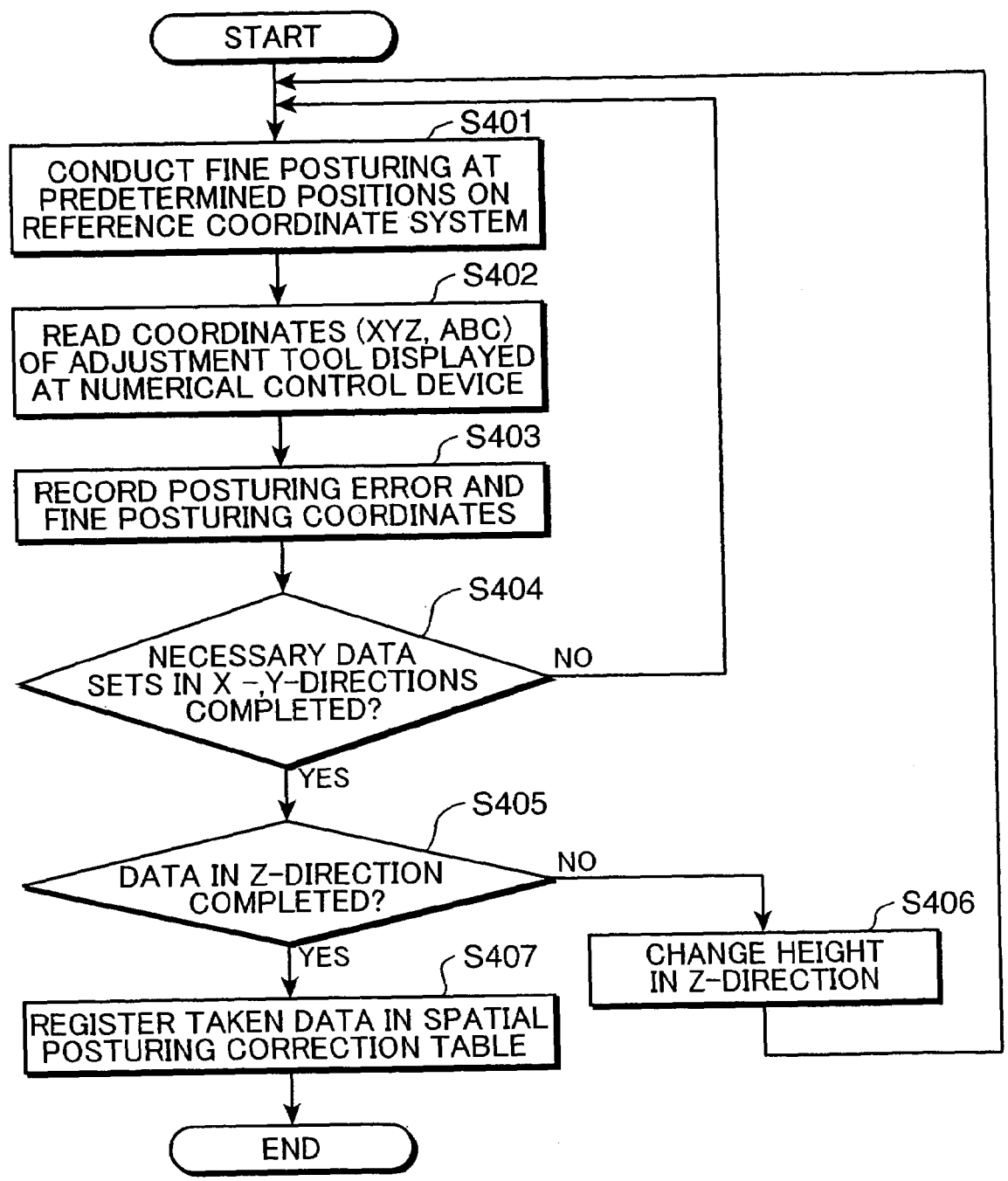
FIG. 8 is a flowchart showing a sequence of operations of registering a correction value in the spatial posturing correction.

FIG. 8 is a flowchart showing a flow of operations of registering correction values for the spatial posturing correction procedure. Before carrying out the spatial posturing correction procedure, the results of the calibration are registered in the numerical control device 100. Subsequently, the predetermined, posturing (e.g., at the reference hole 61 shown in FIG. 4) in the reference coordinate system is precisely determined (Step S401). This posturing manner is identical to that of the data taking at the time of calibration.

Subsequently, coordinate values (XYZ, ABC) of the posturing of the adjustment tool 50 which are displayed on the numerical control device 100 at the time of posturing are read (Step S402). A difference between the read coordinate values and the position coordinates of the fine posturing in the reference coordinate system means a posturing error. This posturing error including orientation is recorded together with the coordinates of the fine posturing in the reference coordinate system (Step S403).

The above-mentioned operations are repeated a required number of times for the X- and Y-directions. In the repeated operations, the predetermined posturing in Step S401 is different from the previous posturing. If the data taking of the necessary number of sets of data in the X- and Y-direction is completed (YES in Step S404). If data taking in the Z-direction is necessary (NO in Step S405), an appropriate jig plate is placed on the reference surface of the reference board 60 to change the distance in the Z-direction by $\Delta Z$ shown in FIG. 7 (Step S406).

The above-mentioned operations are repeated a required number of times for the X-, Y-, and Z-directions, a posturing error is recorded together with position coordinates of the fine posturing in the reference coordinate system. After the data taking is completed (YES in Step S405), the position coordinates of the fine posturing and the posturing error, which are recorded until then, are registered in the spatial posturing correction table (Step S407). The data taking for the spatial posturing correction procedure and the setting of the parameters for the spatial posturing correction procedure are thereby completed.

Figure 9:
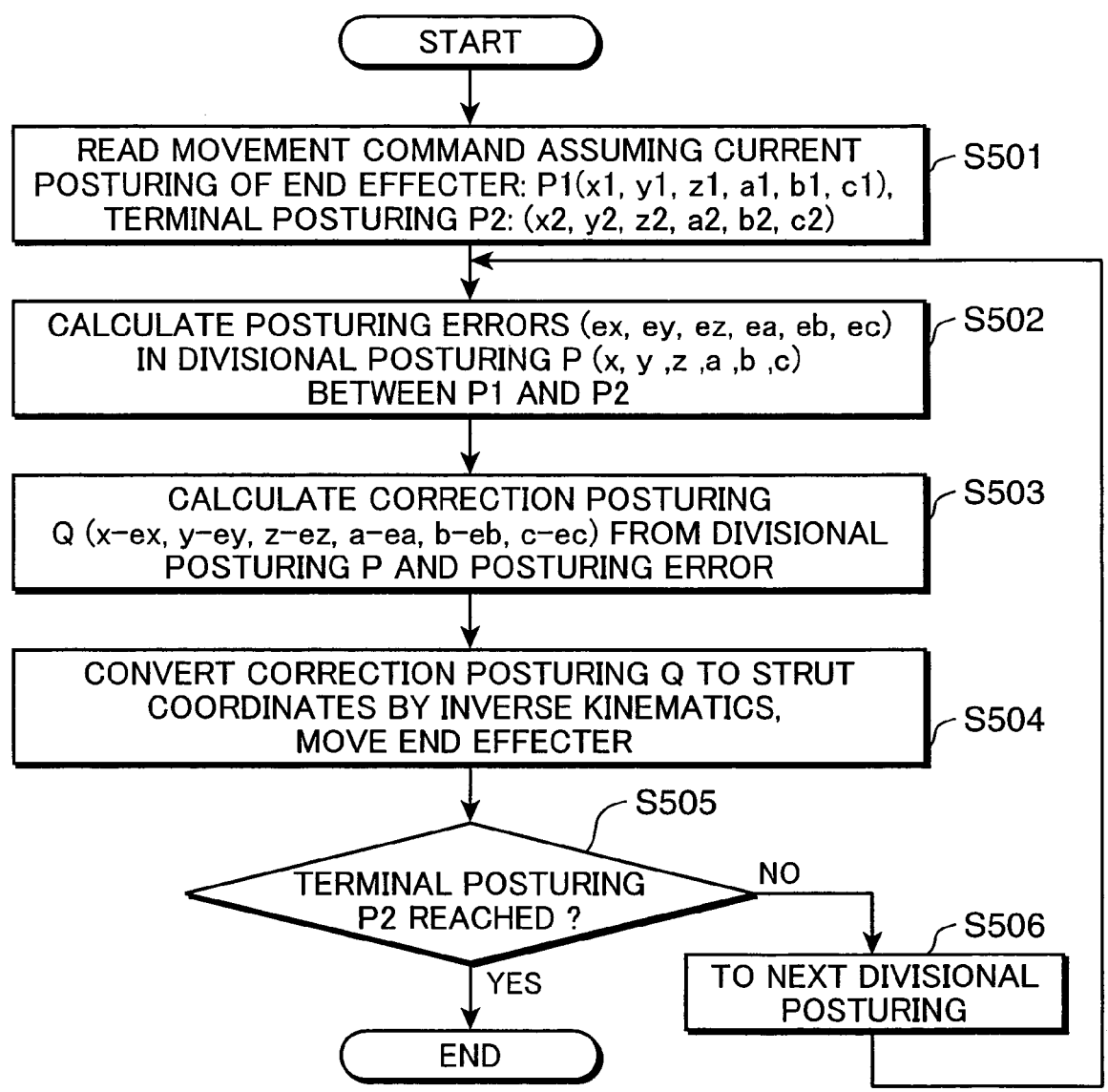
FIG. 9 is a flowchart showing a sequence of a spatial posturing correction executed by a numerical control device provided in the parallel kinematic machine.

Next, description is made about spatial posturing correction procedure using the spatial posturing correction table prepared by the above-described operation flows. FIG. 9 is a flowchart showing a flow of operations of the numerical control device 100 to execute the spatial posturing correction procedure. In this flow, the end effecter 20 is moved from a current posturing to a designated terminal posturing.

Assuming that the current posturing of the end effecter 20 is at P1 (x1, y1, z1, a1, b1, c1), the numerical control device 100 receives a movement command designating a terminal posturing P2 (x2, y2, z2, a2, b2, c2) (Step S501), and separates a space between P1 and P2 into fine divisions, and calculates posturing errors (ex, ey, ez, ea, eb, ec) in each divisional posturing P (x, y, z, a, b, c) based on the spatial posturing correction table (Step S502). Subsequently, a correction posturing Q (x-ex, y-ey, z-ez, a-ea, b-eb, c-ec) is calculated from the divisional posturing P and an error at the divisional posturing P (Step S503).

The numerical control device 100 converts the correction posturing Q to strut coordinates by inverse kinematics, and causes the end effecter 20 to move (Step S504). If it is judged that the position after moving has not yet reached the terminal posturing P2 (NO in Step S505), the next divisional posturing is designated (Step S506), and the flow returns to Step S502. The sequence of these operations is repeated until the end effecter 20 is judged to have reached the terminal posturing P2 (YES in Step S505) at which the spatial posturing correction procedure ends. In the case of the end effecter 20 being greatly inclined, this spatial posturing correction procedure is likely to result in an incomplete correction. In the case of the orientation angular coordinate (ABC) being close to zero, however, this spatial posturing correction procedure can accomplish proper correction.

Verification of the calibration against an actual machine can be confirmed by checking posturing errors obtained by the calculation of correction values for the spatial posturing correction procedure described above. However, if error factors such as repeat accuracy and backlash remain in the actual machine, it is likely to be impossible to accomplish verification of the calibration with respect to the actual machine due to these error factors. Therefore, in the embodiment, a virtual machine is created on a computer, and verification of the calibration is carried out against this virtual machine.

Figure 10:
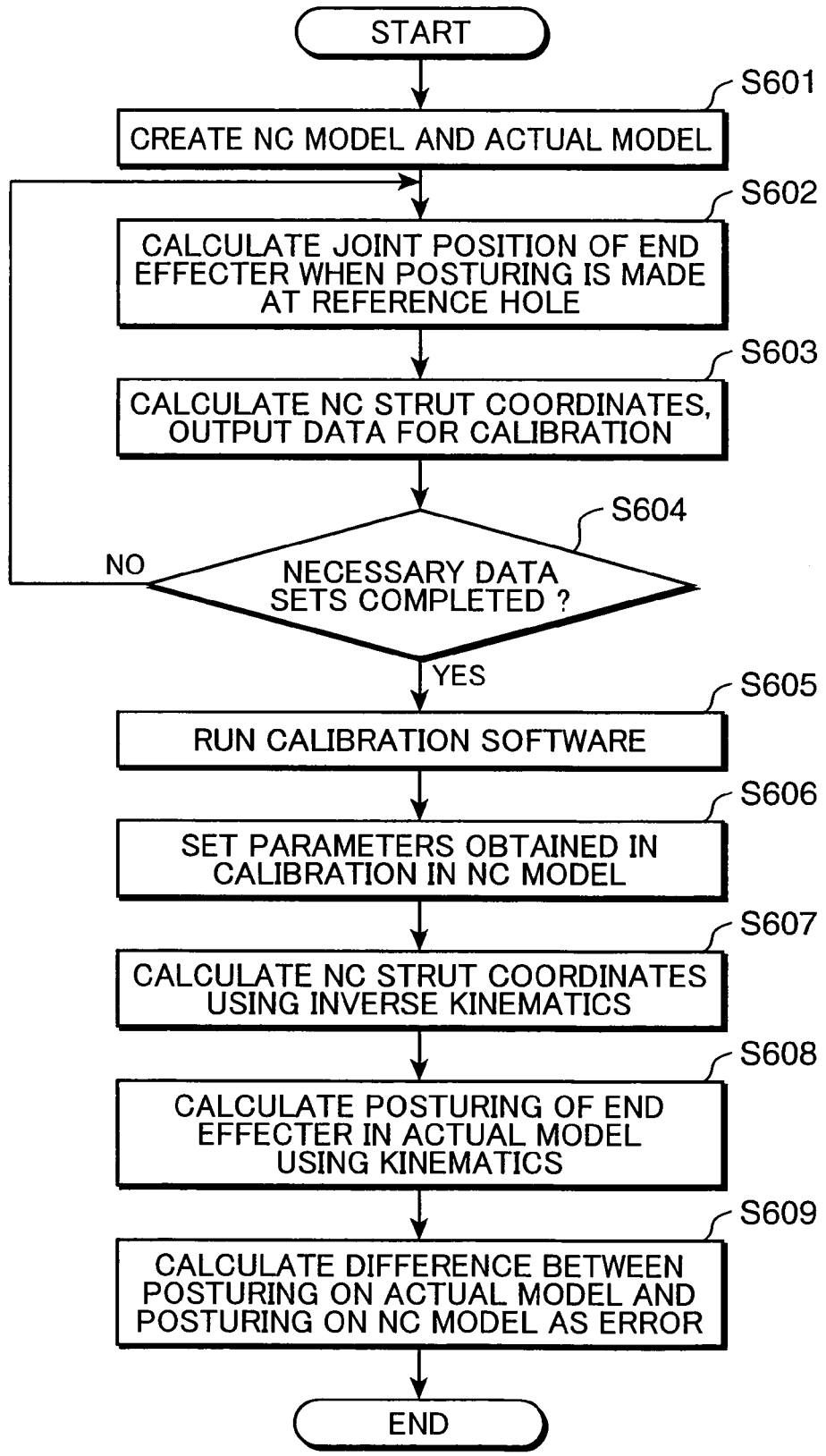
FIG. 10 is a flowchart showing a sequence of checking a calibration by use of a simulation software.

FIG. 10 shows a flow of operations for verifying the calibration using a simulation software. First, a numerical model (hereinafter, referred to as NC model) of a Stewart platform having kinematic parameters set in the numerical control device 100 before the calibration and a numerical model (hereinafter, referred to as actual model) of a Stewart platform having kinematic parameters corresponding to actual dimensions are created on a personal computer (Step S601). This personal computer may be connected with the machine 1, alternatively not be connected with the machine 1. Next, calculation is performed to obtain a position of a joint of the end effecter 20 at the time of posturing the adjustment tool 50 in the reference hole 61 on the actual model (Step S602).

Subsequently, coordinates of a strut of the NC model (i.e., NC strut coordinates) are calculated from the calculated joint position of the end effecter 20, a joint position of the base of the NC model and an origin offset of the strut, and are outputted together with the coordinates of the reference hole 61 as calibration data (Step S603). The sequence of operations from S601 to S603 is repeated a necessary number of times till the required calibration data sets are outputted (Step S604). The necessary number differs depending on the number of kinematic parameters to be identified. In the case of identifying all the kinematic parameters, seven or more data sets are necessary. In the case where the joint positions of the end effecter 20 are measured by a three-dimensional measuring device and used as a constant, four or more data sets are necessary. In the case of identifying all the kinematic parameters to suppress the influence of an irregular gravitational deformation, ten or more data sets are preferable. In the case of using the joint positions of the end effecter 20 as a constant, an optimal number of data sets is six.

The software comprising the calibration algorithm is run on the simulator to calculate kinematic parameters (Step S605). Verification as to whether the calibration algorithm functions normally is accomplished by judging whether the calculated kinematic parameters coincide with the kinematic parameters of the actual model in the range of influence of a round-off error of the numerical control device 100. The influence of a round-off error is assumed to be about twice the minimum set unit of the numerical control device 100. For more reliable verification, the kinematic parameters obtained in the calibration are set in the NC model (Step S606). Thereafter, an error in a given posturing can be checked by using the NC model and the actual model which have been reset.

Various posturing commands are executed on the NC model, and NC strut coordinates to be calculated by the numerical control device 100 each posturing command are then calculated using inverse kinematics (Step S607). Subsequently, the posturing of the end effecter 20 on the actual model which corresponds to the calculated NC strut coordinates is calculated using kinematics (Step S608). A difference between the posturing of the adjustment tool 50 on the actual model and the original posturing command on the NC model is calculated and outputted as a posturing error (Step S609). The above sequence of operations is executed for each posturing to calculate a posturing error based on which it is reliably judged whether the calibration result is normal or not.

Next, the second mode will be described. In the second mode, a special tool 54 is used to take data for calibration in place of the tracer head 51 in the first mode. The special tool 54 comprises a laser measurement device 542 provided at a tip end of the tool for measuring a distance in the X- and Y-directions in the tool tip, a laser measurement device 541 provided at a position sufficiently spaced from an axis for measuring a distance to a reference surface at each of 0, 90, 180 and 270 degree rotation, and a laser measurement device 543 for measuring a distance in the Z-direction.

Figure 11A:
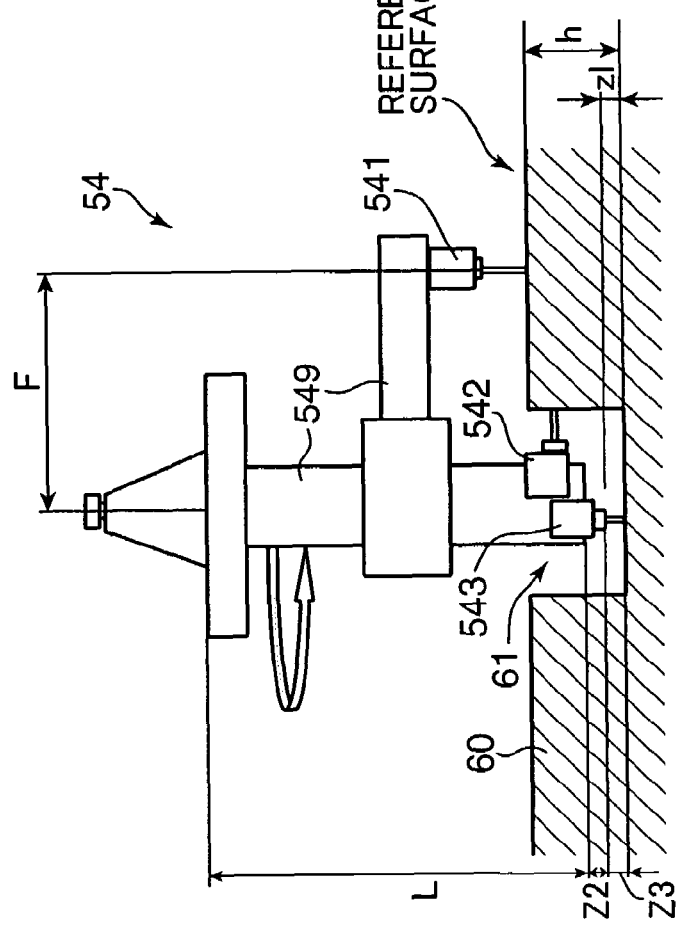
FIGS. 11A to 11C are diagrams showing a second mode of data taking method performed in the parallel kinematic machine, FIG. 11A showing positioning in the spatial coordinate system and orienting in the angular coordinate system, FIGS. 11B and 11C showing determining a reference position with respect to a C-axis.
Figure 11B:
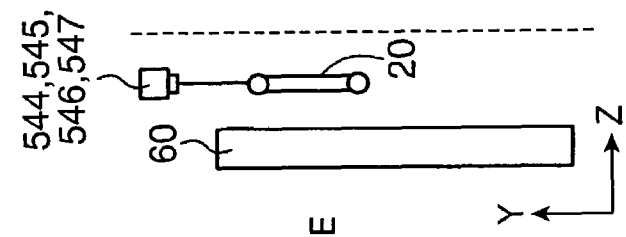
Figure 11C:
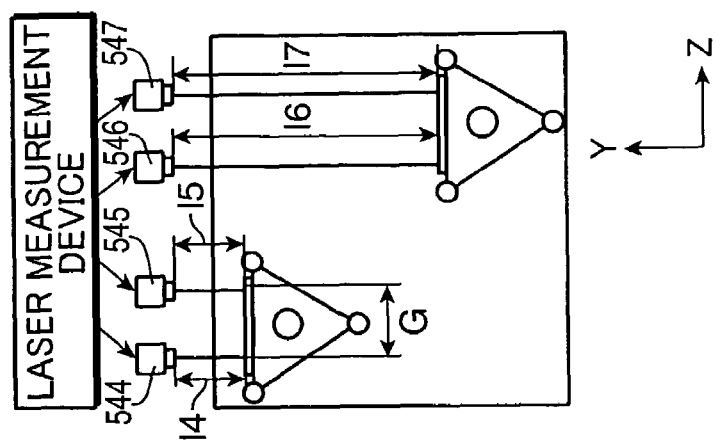

FIGS. 11A to 11C show a data taking manner in the second mode, FIG. 11A showing a posturing in the spatial coordinate system and the angular coordinate system, and FIGS. 11B and 11C show determination of a reference position around the C-axis. FIG. 11B shows a view of the YZ plane in the negative direction of the X-axis, and FIG. 11C shows a view of the XY plane in the positive direction of the Z-axis. In this mode, the adjustment tool 50 is replaced by the special tool 54 comprising supporting sections 549 whose axis is in the agreement with the axis of the end effecter 20, and the laser measurement devices 541 to 543 attached to the supporting sections 549. In this mode, like the first mode, a reference board 60 is formed with a cylindrical reference hole 61 having an axis in a direction orthogonal to a reference surface and planes parallel to the reference surface in a predetermined position thereof. This position is known and the coordinates are (x0, y0, z0). FIG. 11A shows only one reference hole 61, but a predetermined number of holes are formed in predetermined positions.

The laser measurement device (third laser measurement device) 541 is used to adjust the AB-axis, and measures a distance to the reference surface of the reference board 60 while the support section 549 is rotated around the axis. The laser measurement device (first laser measurement device) 542 is used to adjust the XY-axis, and measures a distance to an inner peripheral wall of the reference hole 61. The laser measurement device (second laser measurement device) 543 is used to adjust the Z-axis, and measures a distance to the bottom surface of the reference hole 61. The laser measurement devices 542 and 543 function as a position coordinate adjustment unit and the laser measurement device 541 functions as an orientation adjustment unit.

Figure 12:
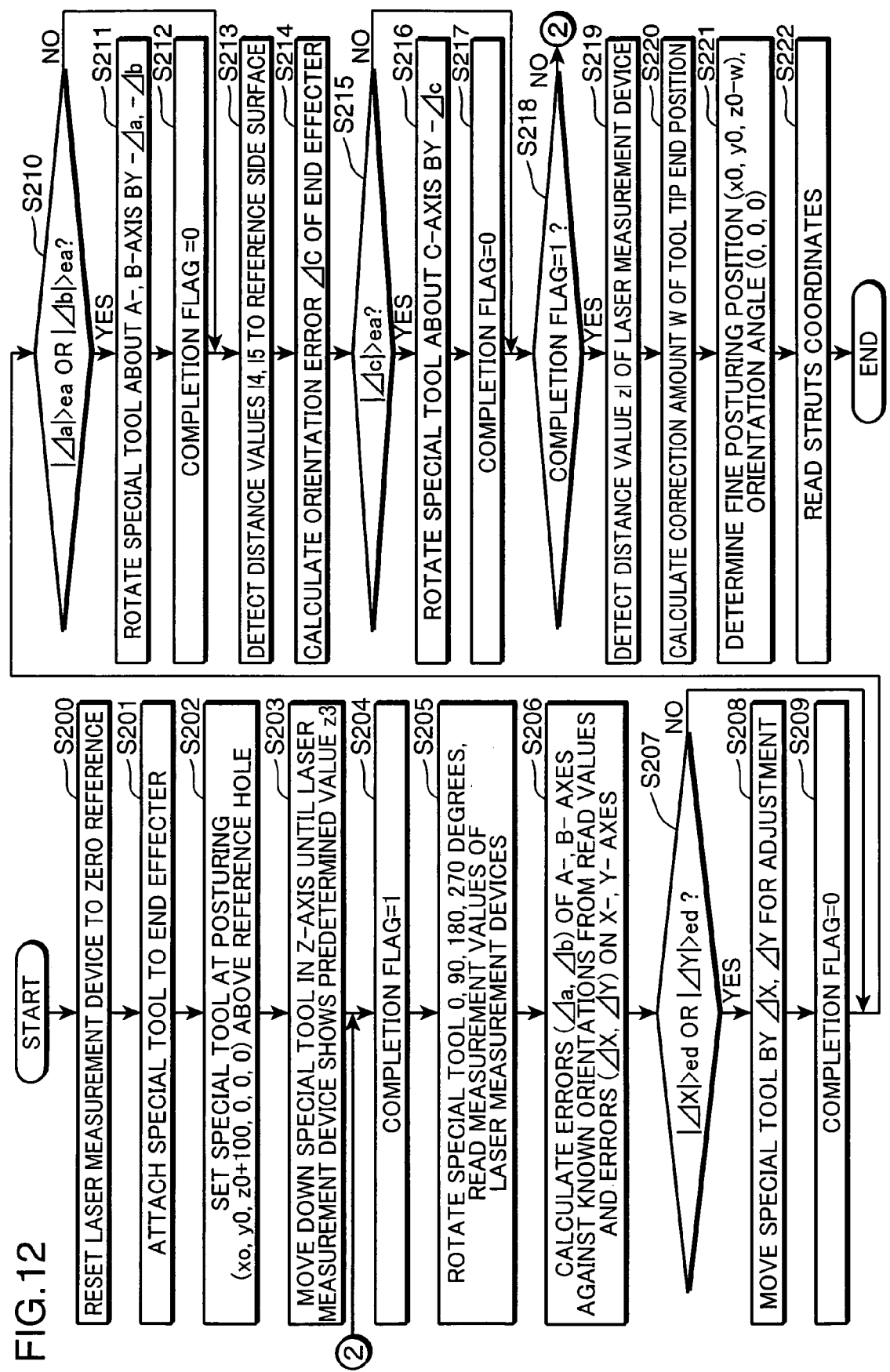
FIG. 12 is a flowchart showing a sequence of operations in the second mode of the data taking method.

Referring to FIG. 12 showing a flow of operations to take data in the second mode. First, the respective end points of the laser measurement devices 541-543 are reset to zero reference. Subsequently, calculation is executed to obtain a distance z2 between the tip end of the tool having a length L and the zero reference of the laser measurement device 543, a distance in the X-direction between the axis of the laser measurement device 541 and the axis of the tool 54, and a distance between the bottom surface of the reference hole 61 and the laser measurement device 543 (that is, reference value in the Z positioning). The zero reference settings of the laser measurement devices 541, 542 may be rough since measured values are used as a relative value.

Next, laser measurement devices (fourth and fifth laser measurement devices) 544 and 545 used to detect the C-axis direction are reset to zero. This is accomplished by adjusting the laser measurement devices 544 and 545 so as to have the same distance to the XZ plane which is parallel to the X-axis and orthogonal to the Z-axis of the reference coordinate system. At this time, a gap G between the laser measurement device 544 and the laser measurement device 545 is obtained. Further, the similar adjustment is carried out with respect to laser measurement devices 546 and 547. These resettings are carried out in Step S200.

Thereafter, the special tool 54 is attached to the end effecter 20 while the axis of the special tool 54 is made to agree with the axis of the end effecter 20, and the five-axis function of the numerical control device 100 at a tool length of L is turned on (Step S201). In this case, the tool length may be L+z2. When the special tool 54 is attached to the end effecter 20, it is required that the laser measurement device 541 deviates substantially in the X direction only with respect to the axis of the special tool 54 at the rotational position of zero degree. The origin of the reference coordinate system specified in advance is made to agree with the current origin of the coordinate system for kinematic parameters in the numerical control device 100. Such origin agreement operation is carried out not more than once with respect to all posturings at such accuracy as to cause no interference when the special tool 54 is moved down in the Z-direction into the reference hole 61. Also, the origin offset is specified on the numerical control device 100.

Subsequently, the special tool 54 is set at a posturing (xo, y0, z0+100, 0, 0, 0) above the reference hole 61 (Step S202), and is moved down in the Z-direction until the laser measurement device 543 shows a predetermined measurement value of z3 (Step S203).

The completion flag is set to "1" (Step S204), and the special tool 54 is rotated to rotational positions of 0, 90, 180 and 270 degrees at which measurement values of the laser measurement devices 541 and 542 are read (Step S205). The measurement values of the laser measurement device 541 are assumed to be e0, e90, e180, and e270, and the measurement values of the laser measurement device 542 are assumed to be x0, y90, x180 and y270. From these read values, differences or errors $\Delta a$ and $\Delta b$ between orientations of the A-axis and the B-axis of the end effecter 20 and known orientations of the A-axis and the B-axis of the reference coordinate system defined on the reference hole 61, differences or errors ΔX and ΔY between positions on the X-axis and the Y-axis of the end effecter 20 and positions on the X-axis and the Y-axis of the reference coordinate system are calculated in accordance with the following Equations (7) to (10).

$$\Delta a = \tan^{-1}(e0-e180) \times 180/\pi \quad (7)$$

$$\Delta b = \tan^{-1}(e270-e90) \times 180/\pi \quad (8)$$

$$\Delta X = (x0-x180)/2 \quad (9)$$

$$\Delta Y = (y90-y270)/2 \quad (10)$$

If the difference between e0 and e180 or the difference between e270 and e90 is small, the Equations (7) and (8) can be approximately expressed as follows.

$$\Delta a = (e0-e180) \times 180/\pi \quad (11)$$

$$\Delta b = (e270-e90) \times 180/\pi \quad (12)$$

If the XY position error calculated in Step S206 is larger than an allowance value ed (|Δx|>ed or |Δy|>ed) (YES in Step S207), the special tool 54 is moved in the X-direction by ΔX and in the Y-direction by ΔY (Step S208). The completion flag is set to "0" (Step S209). On the other hand, if each of both ΔX and ΔY in the X- and Y-directions are equal to or less than the allowance value ed (NO in step 207), the completion flag remains at "1", and the flow advances to adjustment of the orientation angular coordinate system.

If the difference Δa or Δb calculated in Step S206 is larger than an allowance value ea (|Δa|>ea or |Δb|>ea) (YES in Step S210), the special tool 54 is rotated about the A-axis by −Δa or about the B-axis by −Δb (Step S211), and the completion flag is set at "0" (Step S212). In this way, the reference posturing about the A- and B-axes is completed. The flow advances to the reference posturing about the C-axis.

In the reference posturing about the C-axis, distances l4, l5 or l6, l7 of the end effecter 20 to the reference surface are measured (Step S213). Either one of the set of measurement values l4, l5 and the set of measurement values l6, l7 may be used. In the case of using the measurement values l4, l5, the difference or orientation error Δc of the end effecter 20 is calculated in accordance with the following Equation (13) (Step S214).

$$\Delta c = \tan^{-1}(l4-l5) \times 180/\pi \quad (13)$$

If the orientation error Δc is larger than an allowance value ea (|Δc|>ea) (YES in Step S215), the special tool 54 is rotated about the C-axis by −Δc (Step S216), and the completion flag is set at "0" (Step S217). On the other hand, if the orientation error Δc is equal to or less than the allowance value ea (NO in Step S215), the completion flag remains at "1". In this way, the reference posturing about the C-axis is completed.

It is judged in Step S218 whether the completion flag is "1" or not. If the completion flag is judged to be "0" (NO in Step S218), the operation in whichever of Steps S209, S212 and S217 is judged to be skipped, in other words, the XY position adjustment, or the reference posturing about the A-, B-, or C-axis is judged not to be completed, the flow returns to Step S204 to reset a spatial coordinate system. On the other hand, if the completion flag is judged to be "1" (YES in Step S218), all the settings of the X-, Y-, Z-axes, and the A-, B-, C-axes are judged to be completed. The positioning in the spatial coordinate system is carried out by the coordinate drive controller 121, whereas the orienting in the angular coordinate system is carried out by the orientation drive controller 122.

After all the settings of the X-, Y-, Z-axes, and the A-, B-, C-axes are completed, determination of a position and angle for fine posturing is performed. First, the laser measurement device 543 measures a distance z1 (Step S219), and a correction amount w of the tool tip end position is calculated in accordance with the following Equation (14) (Step S220).

$$w = h - z1 - z2 \quad (14)$$

The fine posturing position is thereby determined at (x0, y0, z0-w). The orientation angle is determined at (0, 0, 0) (Step S221). After the position determination for fine posturing is completed, struts coordinates displayed on the numerical control device 100 are read (Step S222). In this way, the data taking necessary for calculation of kinematic parameters of the machine 1 is completed.

In the above-mentioned orientation adjustment, there is a likelihood that kinematic parameters set in the numerical control device 100 have incorrect values, and unmoved portions uncontrollably shift. In view thereof, when adjustment is applied to even one axis, it is necessary to perform the above-mentioned entire adjustment again. The readjustment of all the axes may be carried out separately or all together. However, when adjustment is applied to even one axis, the flow should return to Step S204 to execute the operations again.

Alternatively, it may be appreciated to execute a rough posturing, and not to do the readjustment operation. Specifically, the position and angle determination for the fine posturing is accomplished by strictly executing the adjustment of the special tool 54 with the laser measurement devices to thereby calculate relative errors in the position and orientation coordinates of the reference hole 61, and adding the errors to the position and orientation coordinates of the reference hole 61 in the reference coordinate system. This determination can be carried out owing to the fact that the relative error against the reference value can be correctly calculated from the relative value.

In the second mode described above, either the set of the laser measurement devices 544 and 545 or the set of the laser measurement devices 546 and 547 is used to determine the reference posturing about the C-axis. However, as described in the first mode, it may be appreciated to use a leveler on a reference surface of the end effecter 20. In this case, in Step 200 of FIG. 12, the zero point of the leveler needs to be adjusted.

No description is made about calibration of the machine 1 using the data taken in the data taking operation described above, and spatial correction of errors which occur in resetting kinematic parameters obtained in the calibration to the numerical control device 100 and cannot be ignored because they are identical to those described in the first mode.

Next, the third mode will be described. In the first and second modes, the data taking is automatically carried out using the tool. In the third mode, data for fine posturing is taken by operating a manual handle. This mode can be applied for a case where the origin of the coordinate system for kinematic parameters set in the numerical control device 100 considerably differs from the origin of a reference coordinate system newly defined on a reference board 60. According to this mode, the end effecter 20 is placed in a reference hole 70 of a jig plate 70 by performing posturing with respect to each of the X-, Y-, Z-axes and the A-, B-, C-axes by operating the handle manually. This manual posturing using the handle is similar to the adjustment of a usual five-axis machine, and machine operators can accordingly master the operations easily. Further, this mode has the feature that this calibration can be done for already installed machines without any design changes.

The machine 1 is provided with a push button or a selector switch for selecting the manual handle mode, and a selector switch for selecting one(s) of the twelve axes including the X-, Y-, Z-axes, A-, B-, C-axes, and the E1-, E2-, E3-, E4-, E5-, E6-strut axes that are to be operated by the manual handle. The manual handle provided on the machine 1 generates a positive or negative movement pulse for moving the end effecter 20 with respect to a selected axis in accordance with a rotation of the manual handle. Further, the machine 1 is provided with a selector switch for selecting a unit of movement amount per a graduation of a scale provided on a specified portion of the manual handle. The machine 1 has a numerical control function of receiving the generated movement pulses as a movement command with respect to the selected axis, and calculating coordinates after the movement by adding coordinates corresponding to the movement pulses to the current coordinates, thereby changing the orientation of the end effecter 20.

However, the following description is made about a case where adjustment of the end effecter 20 with respect to the X-, Y-, or Z-axis are done to change the position of the end effecter 20, and adjustment of the end effecter 20 with respect to the A-, B-, or C-axis are done to change the orientation of the end effecter 20, but adjustment of the end effecter 20 with respect to the E1-, E2-, E3-, E4-, E5-, or E6-strut axis are not done.

Figure 13:
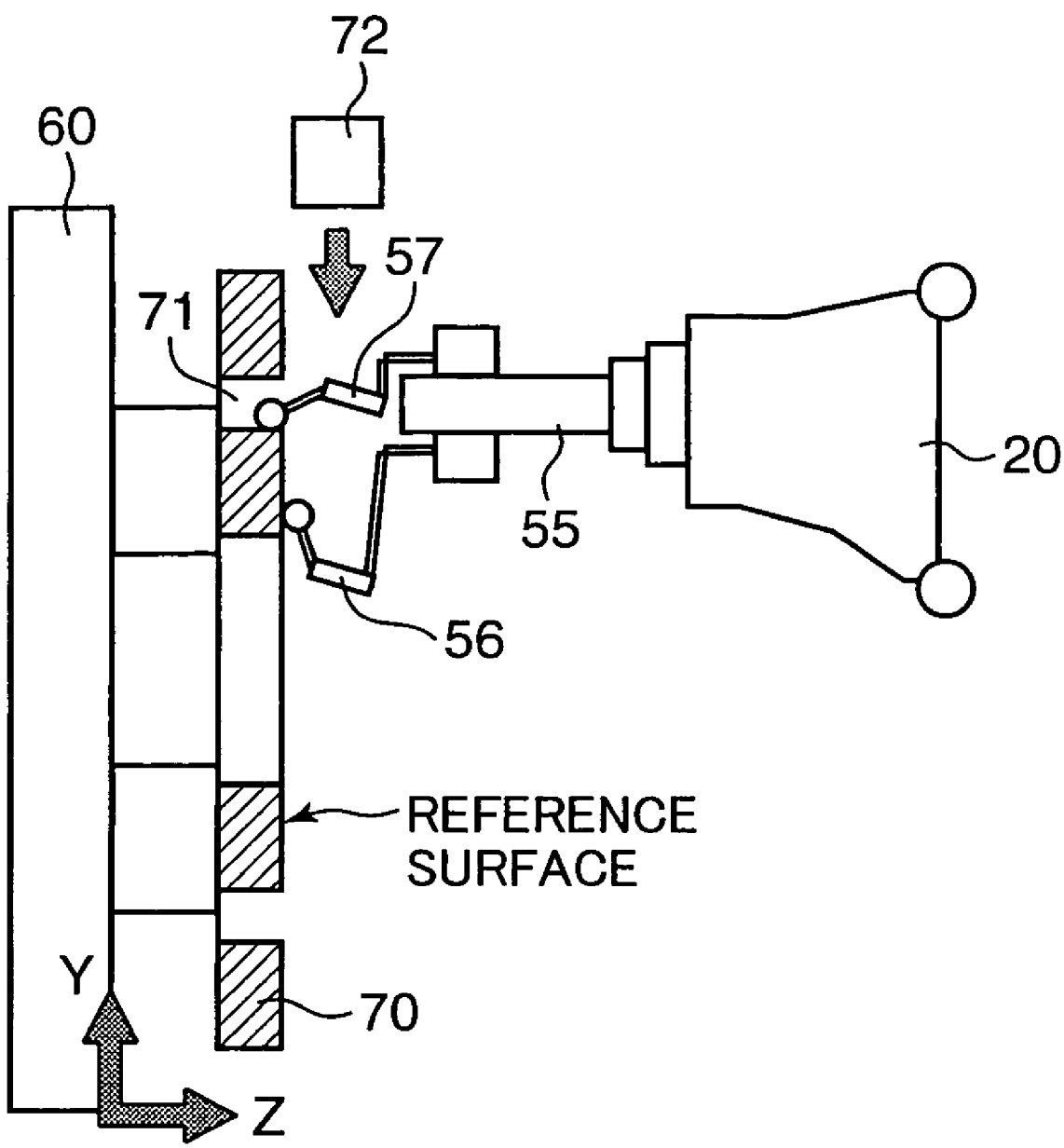
FIG. 13 is a diagram showing a third mode of the data taking method performed in the parallel kinematic machine.

FIG. 13 is a diagram showing an arrangement for executing data taking in the third mode. In this mode, an adjustment tool 50 includes a reference tool 55 attached to the end effecter 20 while the axis of the reference tool 55 is in the agreement with the axis of the end effecter 20. The reference tool 55 is attached with dial gauges 56 and 57. In this mode, a jig plate 70 is placed on the reference surface of the reference board 60. The jig plate 70 is formed with a cylindrical reference hole 71 having an axis extending in a direction orthogonal to the reference surface of the jig plate 70, and top and bottom planes parallel to the reference surface of the jig plate 70. The position at which the reference hole 71 is formed is a known position (x0, y0, z0). The reference hole 71 has no bottom, that is, a through hole from the reference surface of the jig plate 70 to the opposite surface. However, the reference hole 71 may have a bottom wall. Also, there may be formed a plurality of reference holes 71 or a single reference hole 71 in the jig plate 70.

Figure 14:
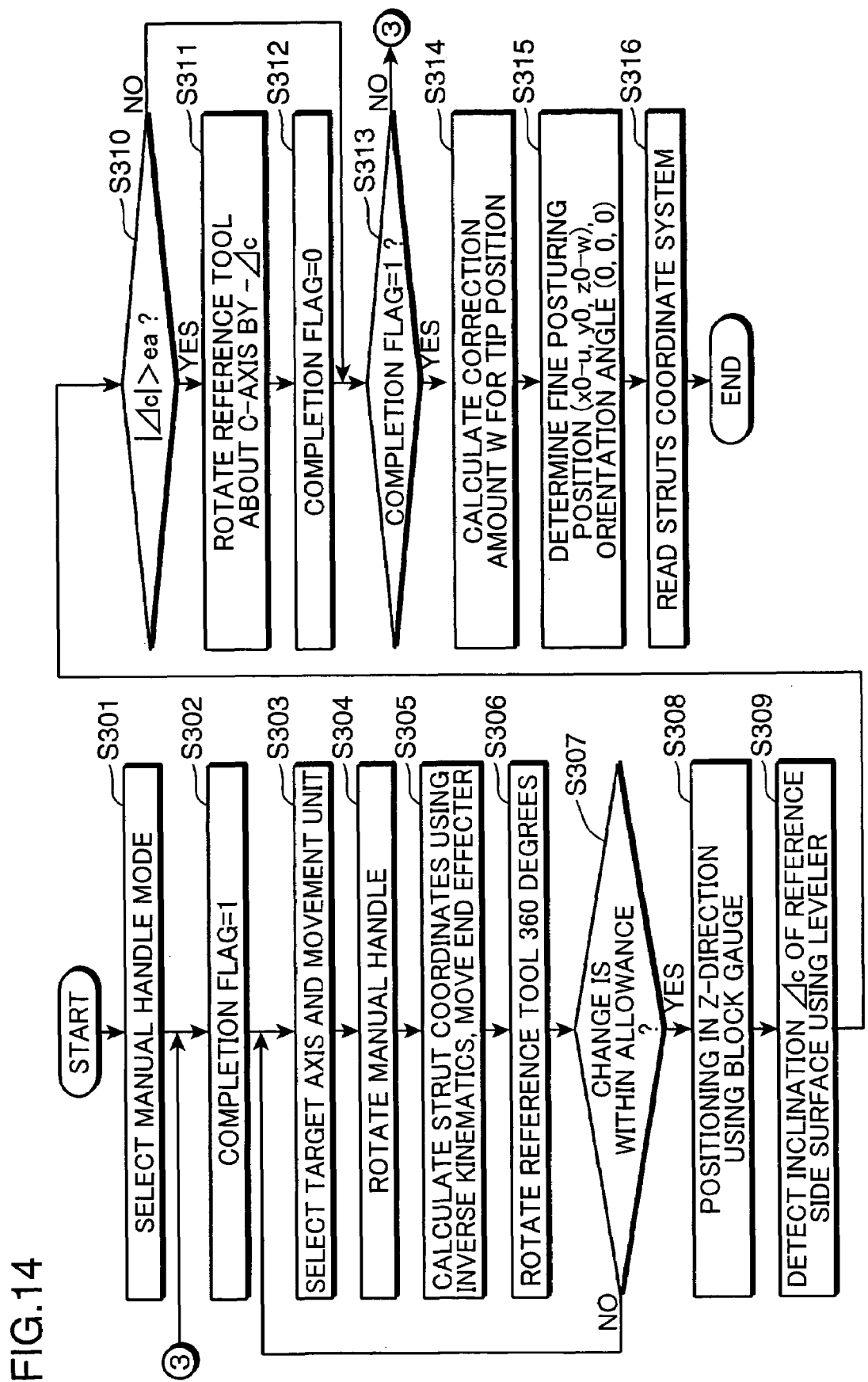
FIG. 14 is a flowchart showing a sequence of operations in the third mode of the data taking method.

Referring to FIG. 14 showing a flow of operations to execute the data taking in the third mode. When the operator of the machine 1 selects the manual handle mode by the selector switch (Step S301), the completion flag is set to "1" (Step S302). After the operator selects a target axis adjustment among the X-, Y-, Z-, A-, B-, and C-axes by the selector switch, a desired movement unit of the manual handle is selected (Step S303), and the manual handle is rotated (Step S304).

The numerical control device 100 detects the selected movement unit and a graduation indicative of a rotation amount of the manual handle, and calculates a movement amount of the end effecter 20 with respect to the selected axis, and calculates a position or angle of the end effecter 20 after movement. The moved position or angle is obtained by adding the calculated movement amount to the current position or angle of the end effecter 20. The numerical control device 100 calculates strut coordinates based on the calculated position or angle using inverse kinematics, and causes the end effecter 20 to move by driving struts (Step S305). In this manual handle operation mode, the five-axis conversion function is valid. In other words, the orientation change with respect to the A-, B-, or C-axis is done at the tip end of the tool.

Next, the operator manually rotates the reference tool 55 360 degrees while keeping the end effecter 20 from moving (Step S306). In this time, the operator sees a change in the dial gauges 56 and 57 to thereby judge whether the change is within an allowance (Step S307). If the change is beyond allowance (NO in Step S307), the flow returns to Step S303. On the other hand, if the change is judged to be within the allowance (YES in Step S307), the flow advances to positioning in the Z-direction.

In this mode, the Z-direction positing is accomplished by inserting a block gauge 72 having a known thickness between the reference surface of the jig plate 70 and the tip end of the reference tool 55 (Step S308).

The subsequent Steps S309 to S316 of performing the reference posturing with respect to the C-axis are identical to Steps S112 to S119 of the first mode shown in FIG. 5. Accordingly, detailed description of these steps is omitted. However, the correction amount w referred to in Steps S117 and S118 is equivalent to the thickness of the block gauge 72 in the third mode.

The dial gauges 56 and 57 are made to be in contact with the reference surface and the inner peripheral wall of the reference hole 71 in such a way that the measurement of the gauges is below the zero point each rotation about the Z-axis. It is not necessary to obtain an absolute value of shift amounts in the X-, Y-, A-, and B-axes.

The calibration of the machine 1 using data taken in the above-mentioned operations of the third mode, and the spatial correction of significant errors which occur in resetting kinematic parameters obtained in the calibration to the numerical control device 100 are identical to those described in the first mode. Accordingly, no description of these operations is made.

In the foregoing embodiments, calibration of a parallel kinematic machine is described. However, the invention is not limited to these embodiments, and can be applied generally to apparatuses provided with a parallel kinematic mechanism, such as robots, manipulators.

In general, the routines or flows executed to implement the embodiment of the invention, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

Furthermore, the invention may embodied as follows.

Figure 15:
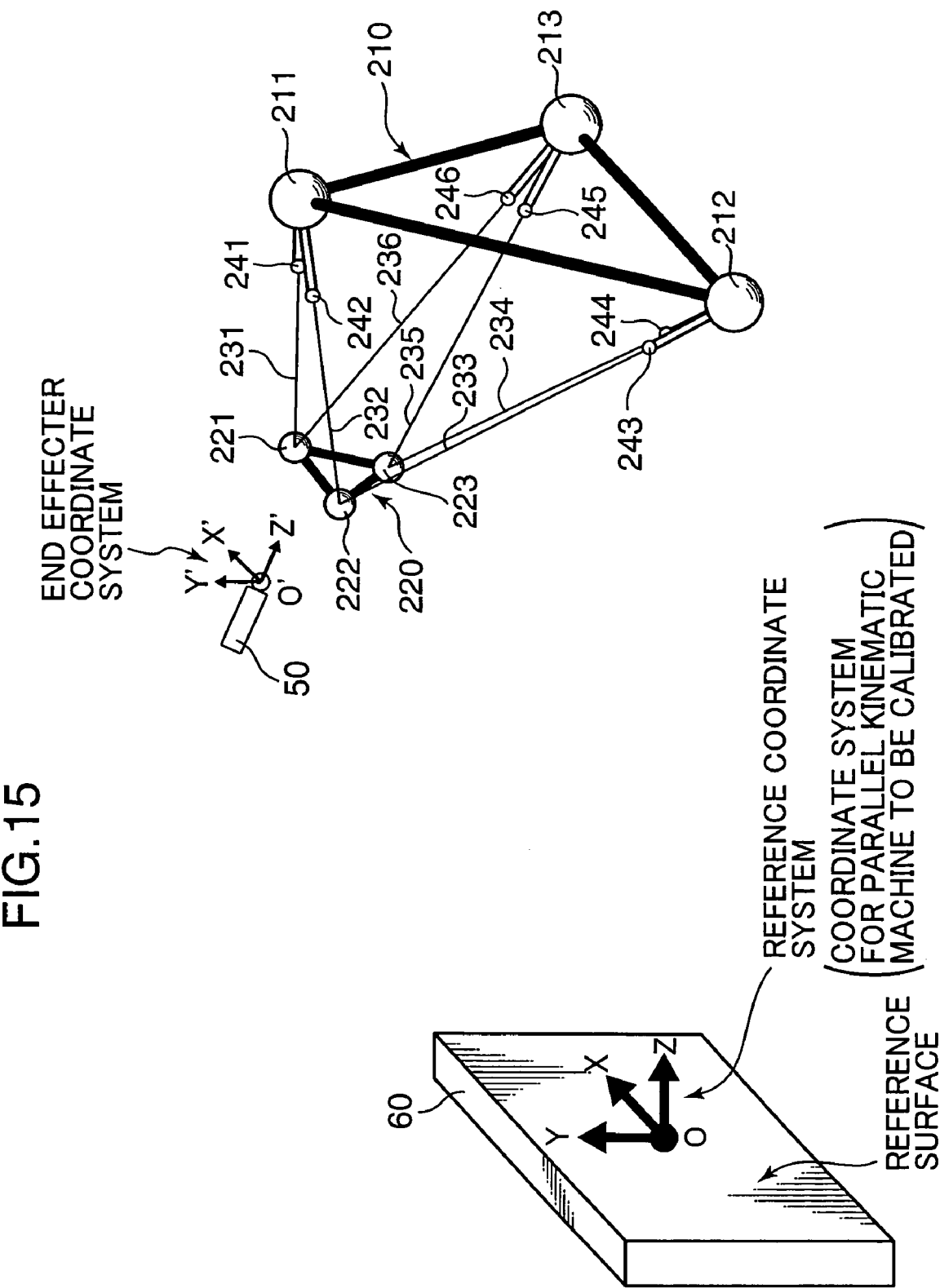
FIG. 15 is a schematic diagram showing a configuration of a 3×3 Stewart platform having 6 degrees of freedom which is adoptable in the parallel kinematic machine.

In the foregoing embodiment, description is made about a 6×6 parallel kinematic machine (having 6 joints on the end effecter and 6 joints on the base). However, the invention is not limited to these embodiments, but can be applied for other parallel kinematic machines, such as, 3×3 parallel kinematic machines (having 3 joints on the end effecter and 3 joints on the base) shown in FIG. 15.

The proper number of sets of data to be taken is four or more in the case of specifying all the parameters, and three or more in the case of using position measurements of the joints of the end effecter 20 by the three-dimension measuring device as constants. In the case of specifying all the parameters in order to suppress the influence of uneven gravitational deformation, the proper number of sets of data to be taken is six. In the case where position measurements of the joint of the end effecter 20 are used as constant, the proper number of data sets is four.

In the foregoing embodiment, the Stewart platform is described as an example of the machines which have straight driving shafts or struts expandable to control the position and the orientation of an end effecter. However, the invention is not limited to these embodiments, but is applicable to other parallel kinematic machines which control the angle with respect to a rotational axis and the angle of a joints to drive. Also, the invention is applicable for any parallel kinematic machine which is controlled in accordance with nonlinear simultaneous equations which define kinematics and inverse kinematics, even if the machine has six degrees of freedom or lower.

Figure 16:
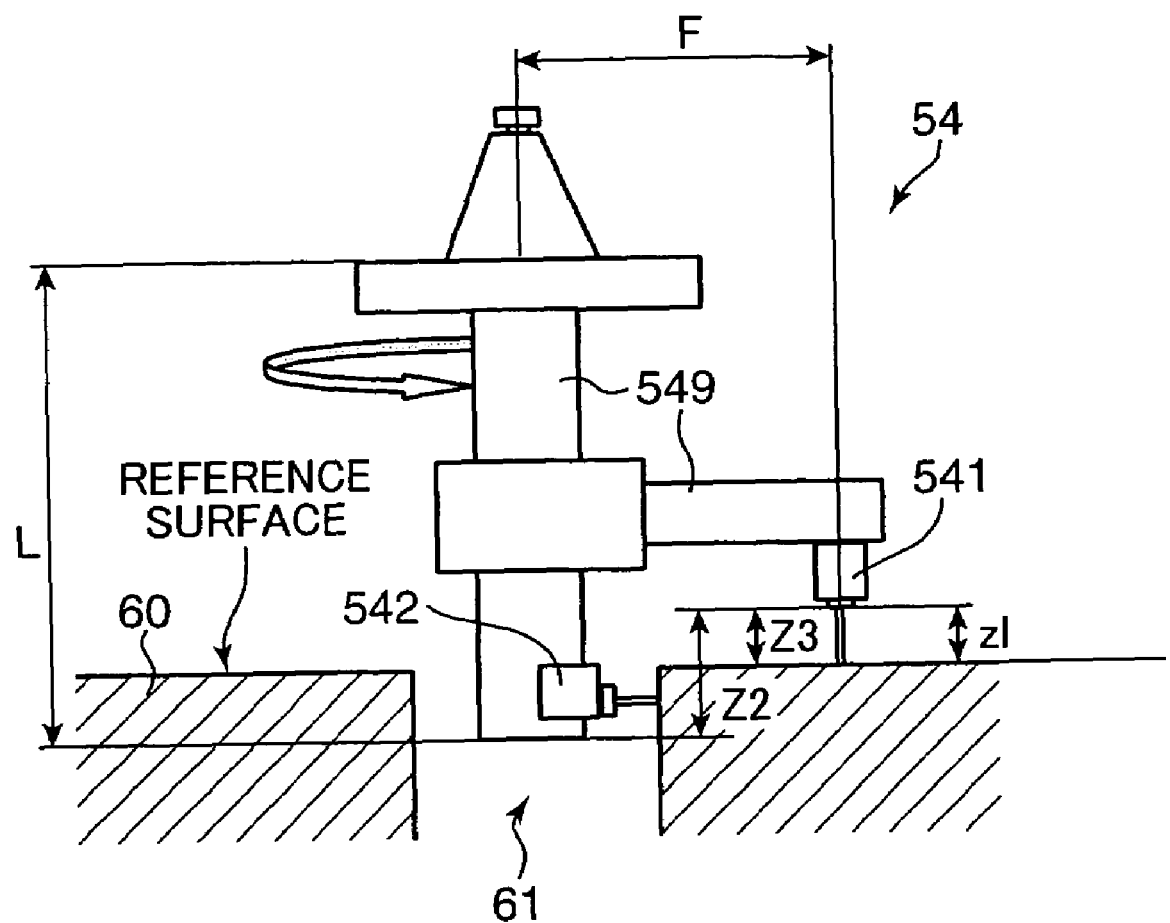
FIG. 16 is a diagram showing a fourth mode of the data taking method performed in the parallel kinematic machine.

In the second mode described above, the reference board 60 is formed with the reference hole 61 having the bottom surface, and the laser measurement device 543 is provided to measure the distance to the bottom surface. However, the invention is not limited to the embodiment. It may be appreciated to form a cylindrical reference hole 61 through a reference board 60, the reference hole 61 having an axis orthogonal to the reference surface of the reference board 60. In this case, the function of the laser measurement device 543 can be performed by the laser measurement device 541 shown in FIG. 16. In other words, the adjustment of an coordinate axis in the direction orthogonal to the reference surface, which is performed by the laser measurement device 543 in the second mode, can be accomplished by positioning so that the distance to the reference surface measured by the laser measurement instrument 541 becomes a predetermined distance.

In the embodiment described above, the X-axis and Y-axis of the reference coordinate system are on the reference surface of the reference board 60 (or jig plate 70). However, the invention is not limited to the embodiment. The reference coordinate system may be placed in a desired posture with respect to the reference surface of the reference board 60 (or jig plate 70). Also, in the forgoing embodiment, the axis of the reference hole 61 or 71 is orthogonal to the X and Y plane of the reference coordinate system. However, it may be appreciated to place the axis of the reference hole in a desired posture with respect to the reference coordinate system. Further, the respective axes of the reference holes 61 and 71 may be arranged at different postures. In this case, the X- and Y-axes of the reference coordinate system is not determined by the tracer head 51 or the special tool 54, but spatial coordinates in two directions parallel to the top surface (reference surface) of the reference hole 61.

In the embodiment described above, the posturing position p[i][ ] including an orientation and a strut coordinate s[i][ ] corresponding to the posturing position are obtained. However, the invention is not limited to the embodiment, but may be applicable for a case where a part of the posturing information including orientation is not obtained. For instance, in the case where an orientation angular coordinate C around the main axis, which is a part of the orientation, cannot be specified, kinematic parameters that minimize Equation 4 described in the first mode are calculated as the minimum value problem. Specifically, kinematic parameters to be calculated and p[1][6], p[2][6], . . . , p[n][6] are unknown. In other words, the number of unknowns increase n which is the number of measurements. This is different from the calculation in the first mode. The term "m[ ][ ][ ]" in Equation 4 is developed into the following Equations, and used to the minimum value problem.

$$m[i][1][1]=-\sin(p[i][4])\times\sin(p[i][5])\times\sin(p[i][6])+\cos(p[i][5])\times\cos(p[i][6]) \quad (15)$$

$$m[i][1][2]=\cos(p[i][4])\times\sin(p[i][6]) \quad (16)$$

$$m[i][1][3]=\sin(p[i][4])\times\cos(p[i][5])\times\sin(p[i][6])-\sin(p[i][5])\times\cos(p[i][6]) \quad (17)$$

$$m[i][2][1]=-\sin(p[i][4])\times\sin(p[i][5])\times\cos(p[i][6])-\cos(p[i][5])\times\sin(p[i][6]) \quad (18)$$

$$m[i][2][2]=\cos(p[i][4])\times\cos(p[i][6]) \quad (19)$$

$$m[i][2][3]=\sin(p[i][4])\times\cos(p[i][5])\times\cos(p[i][6])+\sin(p[i][5])\times\sin(p[i][6]) \quad (20)$$

$$m[i][3][1]=\cos(p[i][4])\times\sin(p[i][5]) \quad (21)$$

$$m[i][3][2]=-\sin(p[i][4]) \quad (22)$$

$$m[i][3][3]=\cos(p[i][4])\times\cos(p[i][5]) \quad (23)$$

This modification can calculate correct kinematic parameters without specifying an orientation angle with respect to the main axis, and is thus advantageous for the case of having a reference hole on an inclined plane.

As described above, an inventive calibration method is adapted for calibrating a parallel kinematic mechanism which is provided with: a base supported on a support platform; an end effecter; a plurality of driver shafts connecting the base and the end effecter via a plurality of joints provided in the base and the end effecter, respectively; and a numerical control device for controlling the posture of the end effecter by manipulating coordinates of each driver shaft using the kinematics or the inverse kinematics. The calibration method comprises: a setting step of setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter; a taking step of taking coordinates of the posture of the adjustment tool each time the adjustment tool is placed in the posture; a recording step of recording coordinates of each driver shaft manipulated by the numerical control device in accordance with the inverse kinematics each time the adjustment tool is placed in the posture; and a calculating step of calculating kinematic parameters necessary for the kinematics of the parallel kinematic mechanism based on the taken coordinates of the postures of the driver shafts and the recorded coordinates of the driver shafts.

In this calibration method, posturing is carried out in the already known postures. Accordingly, measurement after posturing is no longer required. The omission of operation at the measurement difficult position can assure more accurate calibration.

It may be preferable that the adjustment tool includes a coordinate adjustment unit and an orientation adjustment unit, and the setting step includes: setting the adjustment tool in such a position as to specify the position of the adjustment tool based on coordinates of a reference hole formed at a predetermined position in the reference coordinate system and measurements of the coordinate adjustment unit to determine a spatial coordinate, the reference hole having a cylindrical inner peripheral surface around an axis of the reference hole perpendicularly intersecting a reference surface; setting the adjustment tool in such a position as to specify two orientation angle coordinates expressing an orientation of the axis of the end effecter based on relative distance between the reference surface and a rotation plane of the orientation adjustment unit being rotated about the axis of the end effecter to determine the two orientation angle coordinates, and adjust the orientation of the end effecter so that a reference side of the end effecter becomes parallel to a predetermined line, and determine orientation angle coordinates of the end effecter about the axis of the end effecter.

Accordingly, the adjustment tool can be more easily postured because the provision of the coordinate adjustment unit and the orientation adjustment unit enables separate coordinate adjustment and orientation adjustment.

The coordinate adjustment unit may preferably comprise a tracer head including a stylus having a diameter larger than the diameter of the reference hole, and the spatial coordinates are determined by positioning the adjustment tool so that the stylus receives only a force in a direction orthogonal to the reference surface when the stylus comes into contact with the reference hole.

This arrangement can assure more efficient positioning because the single tracer head accomplishes positioning of spatial coordinates in X-, Y-, and Z-directions.

It may be preferable that the reference hole has a bottom surface, and the coordinate adjustment unit is insertable in the reference hole, and comprises a first laser measurement device sending out a laser beam in a direction parallel to the reference surface, and a second laser measurement device sending out a laser beam in a direction orthogonal to the reference surface, and the setting step include: setting the adjustment tool in such a position as to equalize the distances against the inner peripheral surface of the reference hole measured by the first laser measurement device, or as to specify spatial coordinates in two direction parallel to the reference surface based on the measurements of the first laser measurement device and the coordinates of the reference hole to thereby determine spatial coordinates in the two direction parallel to the reference surface; setting the adjustment tool in such a position as to make the distance against the bottom surface hole measured by the second laser measurement device reach a predetermined value, or as to specify spatial coordinates in a direction orthogonal to the reference surface based on the measurements of the second laser measurement device and the coordinates of the bottom surface of the reference hole to thereby determine spatial coordinates in the direction orthogonal to the reference surface.

In this arrangement, distances to the bottom surface or the inner peripheral surface of the reference hole can be measured accurately by the laser measurement device. Accordingly, the spatial coordinates in the X-, Y-, and Z-directions can determined more accurately.

The orientation adjustment unit may be preferably provided with a dial gauge for adjusting the orientation of the adjustment tool so as to equalize the distances against the reference surface measured by the dial gauge in all the rotational angles of the orientation adjustment unit rotated about the axis of the end effecter to thereby make the rotation plane of the orientation adjustment unit parallel to the reference surface.

With this arrangement, two orientation angular coordinates specifying an inclination of the axis of the end effecter can be more effectively determined by the simple construction having the dial gauge.

The orientation adjustment unit may be preferably provided with a third laser measurement device. It this case, the setting step may be accomplished by setting the adjustment tool in such a position as to equalize the distances against the reference surface measured by the third laser measurement device in all the rotational angles of the orientation adjustment unit rotated about the axis of the end effecter, or specify two orientation angle coordinates defining an orientation of the axis of the end effecter among three orientation angle coordinates defining an orientation of the end effecter based on measurements of the third laser measurement device to thereby determine the two orientation angle coordinates.

With this arrangement, two orientation angular coordinates specifying an inclination of the axis of the end effecter can be more accurately determined by use of the laser measurement device which accurately measures the distance to the reference surface.

It may be preferable that the reference hole has a throughout space and a cylindrical inner peripheral surface parallel to an axis of the reference hole; and the coordinate adjustment unit is insertable in the reference hole, and comprises a first laser measurement device sending out a laser beam in a direction parallel to the reference surface; the orientation adjustment unit comprises a second laser measurement device sending out a laser beam to the reference surface; and the setting step includes: setting the adjustment tool in such a position as to equalize the distances against the inner peripheral surface of the reference hole measured by the first laser measurement device, or as to specify spatial coordinates in two direction parallel to the reference surface based on the measurements of the first laser measurement device and the coordinates of the reference hole to thereby determine spatial coordinates in the two direction parallel to the reference surface; setting the adjustment tool in such a position as to equalize the distance against the reference surface measured by the second laser measurement device in all the rotational angles of the orientation adjustment unit rotated about the axis of the end effecter, the equalized distance having a predetermined value, or specify spatial coordinates in a direction orthogonal to the reference surface based on measurements of the second laser measurement device and the distance to the reference surface to thereby determine spatial coordinates in the direction orthogonal to the reference surface.

This construction makes it possible to accurately determine spatial coordinates in the X-, Y-, and Z-directions and two orientation angular coordinates by the simple configuration using only the first and second laser measurement devices.

It may be preferable to further provide a fourth laser measurement device and a fifth laser measurement device for emitting laser beams in a direction on an XY plane of the reference coordinate system. In this case, the setting step may include setting the adjustment tool in such a posture as to allow the reference side surface of the end effecter parallel with the predetermined line based on distances to the reference side surface measured by the fourth and fifth laser measurement devices to thereby determine an orientation of the adjustment tool with respect to the axis of the end effecter.

In this configuration, the fourth and fifth laser measurement devices accurately measure distances to the reference side surface, which makes it possible to determine a reference position of orientation angular coordinates about the axis of the end effecter more accurately.

It may be preferable that a normal direction of the base supported by the support platform is orthogonal to a vertical direction, and a leveler is provided on a reference side surface of the end effecter, and the end effecter is adjusted so that the reference side surface of the end effecter becomes parallel with the predetermined line based on results of the leveler, to thereby determine an orientation angle of the adjustment tool with respect to the axis of the end effecter.

The provision of the leveler, which is simpler in construction, can ensure the accurate determination of a reference position of orientation angular coordinates about the axis of the end effecter.

It may be preferable that in the calculating step, kinematic parameters necessary for the kinematics of the parallel kinematic mechanism are calculated based on the condition that a distance between the joint of the end effecter in the posture and the joint of the base is equal to a sum of the recorded coordinates of each driver shaft connecting the joints with each other and an offset coordinates indicative of a shift amount of the origin of each driver shaft.

The kinematic parameters can be calculated based on the condition that the distance is equal to the sum without complicated calculation such as partial differentiation or Fourier series. Accordingly, the equation is clear, and calculated parameters are accurate.

An inventive correction data acquiring method comprises the steps of: inputting in the numerical control device the kinematic parameters calculated in the calculating step of the above-mentioned inventive calibration method; setting the adjustment tool in a posture; calculating a difference between taken coordinates of the postured adjustment tool and coordinates of the adjustment tool controlled by the numerical control device based on the kinematics as a correction value; and recording the calculated correction value in correspondence to coordinates of the adjustment tool postured in the reference coordinates system.

This method makes it possible to acquire correction data to correct posture errors that are caused by irregular gravitational deformations and will be remain after the calibration.

An inventive verifying method is adapted for verifying calibration of a parallel kinematic mechanism which is provided with a base supported on a support platform, an end effecter, a plurality of driver shafts connecting the base and the end effecter via a plurality of joints provided in the base and the end effecter, respectively, and a numerical control device for controlling the posture of the end effecter by manipulating coordinates of each driver shaft using the kinematics or the inverse kinematics. The method comprises the steps: generating an NC model including an mathematical model expressing the parallel kinematic mechanism, and errors which is set in the numerical control device before the calibration; generating an actual model including the mathematical model, and kinematic parameters equivalent to actual dimensions; setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter; taking coordinates of the posture of the adjustment tool in the NC model each time the adjustment tool is placed in the posture; recording coordinates of each driver shaft manipulated by the numerical control device in accordance with the inverse kinematics in the NC model each time the adjustment tool is placed in the posture; calculating kinematic parameters necessary for the kinematics of the parallel kinematic mechanism based on the taken coordinates of the postures of the driver shafts and the recorded coordinates of the driver shafts in the NC model; and judging whether the calculated kinematic parameters agree with the kinematic parameters of the actual model.

In this configuration, the judgment as to whether the calibration is good or not can be made at a higher accuracy because of using the mathematical model having no error causing factors such as backlash and repeat accuracy which are assumed in actual equipment.

An inventive program product is adapted for verifying calibration of a parallel kinematic mechanism which is provided with a base supported on a support platform, an end effecter, a plurality of driver shafts connecting the base and the end effecter via a plurality of joints provided in the base and the end effecter, respectively, and a numerical control device for controlling the posture of the end effecter by manipulating coordinates of each driver shaft using the kinematics or the inverse kinematics. The program product comprises: a program configured to generate an NC model including an mathematical model expressing the parallel kinematic mechanism, and errors which is set in the numerical control device before the calibration; generate an actual model including the mathematical model, and kinematic parameters equivalent to actual dimensions; set an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter; take coordinates of the posture of the adjustment tool in the NC model each time the adjustment tool is placed in the posture; record coordinates of each driver shaft manipulated by the numerical control device in accordance with the inverse kinematics in the NC model each time the adjustment tool is placed in the posture; calculate kinematic parameters necessary for the kinematics of the parallel kinematic mechanism based on the taken coordinates of the postures of the driver shafts and the recorded coordinates of the driver shafts in the NC model; and judge whether the calculated kinematic parameters agree with the kinematic parameters of the actual model; and a signal bearing media bearing the program.

The program product enables the accurate judgment about whether the calibration is good or not because the mathematical model does not have error causing factors such as backlash and repeat accuracy which are assumed in actual equipment.

An inventive data taking method is adapted for taking data for calibration of a parallel kinematic mechanism which is provided with a base supported on a support platform, an end effecter, a plurality of driver shafts connecting the base and the end effecter via a plurality of joints provided in the base and the end effecter, respectively, and a numerical control device for controlling the posture of the end effecter by manipulating coordinates of each driver shaft using the kinematics or the inverse kinematics, the method comprising the steps of: setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter; and calculating a position and an orientation of the end effecter.

The data taking method requires no measurements after posturing because the posturing is carried out in the known posture. Because operations at the measurement difficult position are not required, data which assures more accurate calibration can be easily taken up.

This application is based on patent application No. 2005-56688 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A calibration method for calibrating a parallel kinematic mechanism which is provided with:
    a base supported on a support platform;
    an end effecter;
    a plurality of driver shafts connecting the base and the end effecter via a plurality of joints provided in the base and the end effecter, respectively; and
    a numerical control device for controlling the posture of the end effecter by manipulating coordinates of each driver shaft using the kinematics or the inverse kinematics;
    the calibration method comprising:
        a setting step of setting an adjustment tool attached to the end effecter in a specified number of different predetermined known postures in a reference coordinate system provided outside the parallel kinematic mechanism, an axis of the adjustment tool being in agreement with an axis of the end effecter, the adjustment tool including a measurement device, a coordinate adjustment unit and an orientation adjustment unit, the setting being performed based on a measurement of the measurement device, the setting step further including setting the adjustment tool in such a position as to specify the position of the adjustment tool based on coordinates of a reference hole formed at a predetermined position in the reference coordinate system and measurements of the coordinate adjustment unit to determine a spatial coordinate, the reference hole having a cylindrical inner peripheral surface around an axis of the reference hole perpendicularly intersecting a reference surface, and the setting step also including setting the adjustment tool in such a position as to specify two orientation angle coordinates expressing an orientation of the axis of the end effecter based on relative distance between the reference surface and a rotation plane of the orientation adjustment unit being rotated about the axis of the end effecter to determine the two orientation angle coordinates, and adjust the orientation of the end effecter so that a reference side of the end effecter becomes parallel to a predetermined line, and determine orientation angle coordinates of the end effecter about the axis of the end effecter;
        a recording step of recording actual coordinates of each driver shaft manipulated by the numerical control device in accordance with the inverse kinematics each time the adjustment tool is placed in the posture; and
        a calculating step of calculating kinematic parameters necessary for the kinematics of the parallel kinematic mechanism based on original coordinates of the postures of the driver shafts and the recorded actual coordinates of the driver shafts.

2. The calibration method according to claim 1, wherein the coordinate adjustment unit comprises a tracer head including a stylus having a diameter larger than the diameter of the reference hole, and the spatial coordinates are determined by positioning the adjustment tool so that the stylus receives only a force in a direction orthogonal to the reference surface when the stylus comes into contact with the reference hole.

3. The calibration method according to claim 1, wherein the orientation adjustment unit comprises a dial gauge for adjusting the orientation of the adjustment tool so as to equalize the distances against the reference surface measured by the dial gauge in all the rotational angles of the orientation adjustment unit rotated about the axis of the end effecter to thereby make the rotation plane of the orientation adjustment unit parallel to the reference surface.

4. The calibration method according to claim 1, wherein the orientation adjustment unit comprises a third laser measurement device, and the setting step includes:
    setting the adjustment tool in such a position as to equalize the distances against the reference surface measured by the third laser measurement device in all the rotational angles of the orientation adjustment unit rotated about the axis of the end effecter, or specify two orientation angle coordinates defining an orientation of the axis of the end effecter among three orientation angle coordinates defining an orientation of the end effecter based on measurements of the third laser measurement device to thereby determine the two orientation angle coordinates.

5. The calibration method according to claim 1, further comprising a fourth laser measurement device and a fifth laser measurement device for emitting laser beams in a direction on an XY plane of the reference coordinate system, wherein the setting step includes setting the adjustment tool in such a posture as to allow the reference side surface of the end effecter parallel with the predetermined line based on distances to the reference side surface measured by the fourth and fifth laser measurement devices to thereby determine an orientation of the adjustment tool with respect the axis of the end effecter.

6. The calibration method according to claim 1, wherein a normal direction of the base supported by the support platform is orthogonal to a vertical direction, and a leveler is provided on a reference side surface of the end effecter, and the end effecter is adjusted so that the reference side surface of the end effecter becomes parallel with the predetermined line based on results of the leveler, to thereby determine an orientation angle of the adjustment tool with respect to the axis of the end effecter.

7. The calibration method according to claim 1, wherein in the calculating step, kinematic parameters necessary for the kinematics of the parallel kinematic mechanism are calculated based on the condition that a distance between the joint of the end effecter in the posture and the joint of the base is equal to a sum of the recorded coordinates of each driver shaft connecting the joints with each other and offset coordinates indicative of a shift amount of the origin of each driver shaft.

8. A calibration method for calibrating a parallel kinematic mechanism which is provided with:
   a base supported on a support platform;
   an end effecter;
   a plurality of driver shafts connecting the base and the end effecter via a plurality of joints provided in the base and the end effecter, respectively; and
   a numerical control device for controlling the posture of the end effecter by manipulating coordinates of each driver shaft using the kinematics or the inverse kinematics;
   the calibration method comprising:
      a setting step of setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter, the adjustment tool including a coordinate adjustment unit and an orientation adjustment unit;
      a taking step of taking coordinates of the posture of the adjustment tool each time the adjustment tool is placed in the posture;
      a recording step of recording coordinates of each driver shaft manipulated by the numerical control device in accordance with the inverse kinematics each time the adjustment tool is placed in the posture; and
      a calculating step of calculating kinematic parameters necessary for the kinematics of the parallel kinematic mechanism based on the taken coordinates of the postures of the driver shafts and the recorded coordinates of the driver shafts, wherein the setting step includes:
         setting the adjustment tool in a position to specify the position of the adjustment tool based on coordinates of a reference hole formed at a predetermined position in the reference coordinate system and based on measurements of the coordinate adjustment unit to determine a spatial coordinate, the reference hole having a cylindrical inner peripheral surface around an axis of the reference hole perpendicularly intersecting a reference surface, the reference hole further having a bottom surface, the coordinate adjustment unit being insertable in the reference hole, and comprising a first laser measurement device sending out a laser beam in a direction parallel to the reference surface, and a second laser measurement device sending out a laser beam in a direction orthogonal to the reference surface;
         setting the adjustment tool in a position to specify two orientation angle coordinates expressing an orientation of the axis of the end effecter based on relative distance between the reference surface and a rotation plane of the orientation adjustment unit being rotated about the axis of the end effecter to determine the two orientation angle coordinates, and adjusting the orientation of the end effecter so that a reference side of the end effecter becomes parallel to a predetermined line, and determining orientation angle coordinates of the end effecter about the axis of the end effecter,
         setting the adjustment tool in a position to equalize the distances against the inner peripheral surface of the reference hole measured by the first laser measurement device, so as to specify spatial coordinates in two directions parallel to the reference surface based on the measurements of the first laser measurement device and the coordinates of the reference hole to thereby determine spatial coordinates in the two directions parallel to the reference surface; and
         setting the adjustment tool in a position to make the distance against the bottom surface of the reference hole measured by the second laser measurement device reach a predetermined value, so as to specify spatial coordinates in a direction orthogonal to the reference surface based on the measurements of the second laser measurement device and the coordinates of the bottom surface of the reference hole to thereby determine spatial coordinates in the direction orthogonal to the reference surface.

9. The calibration method according to claim 8, wherein the orientation adjustment unit comprises a dial gauge for adjusting the orientation of the adjustment tool so as to equalize the distances against the reference surface measured by the dial gauge in all the rotational angles of the orientation adjustment unit rotated about the axis of the end effecter to thereby make the rotation plane of the orientation adjustment unit parallel to the reference surface.

10. The calibration method according to claim 8, wherein the orientation adjustment unit comprises a third laser measurement device, and the setting step includes:
    setting the adjustment tool in such a position as to equalize the distances against the reference surface measured by the third laser measurement device in all the rotational angles of the orientation adjustment unit rotated about the axis of the end effecter, or specify two orientation angle coordinates defining an orientation of the axis of the end effecter among three orientation angle coordinates defining an orientation of the end effecter based on measurements of the third laser measurement device to thereby determine the two orientation angle coordinates.

11. A calibration method for calibrating a parallel kinematic mechanism which is provided with:
    a base supported on a support platform;
    an end effecter;
    a plurality of driver shafts connecting the base and the end effecter via a plurality of joints provided in the base and the end effecter, respectively; and
    a numerical control device for controlling the posture of the end effecter by manipulating coordinates of each driver shaft using the kinematics or the inverse kinematics;
    the calibration method comprising:
       a setting step of setting an adjustment tool attached to the end effecter in a specified number of different predetermined postures in a reference coordinate system provided outside the parallel kinematic mechanism to define a reference coordinate system of the parallel kinematic mechanism, an axis of the adjustment tool being in agreement with an axis of the end effecter, the adjustment tool including a coordinate adjustment unit and an orientation adjustment unit,
       a taking step of taking coordinates of the posture of the adjustment tool each time the adjustment tool is placed in the posture;

a recording step of recording coordinates of each driver shaft manipulated by the numerical control device in accordance with the inverse kinematics each time the adjustment tool is placed in the posture; and a calculating step of calculating kinematic parameters necessary for the kinematics of the parallel kinematic mechanism based on the taken coordinates of the postures of the driver shafts and the recorded coordinates of the driver shafts, wherein the setting step includes:

setting the adjustment tool in a position to specify the position of the adjustment tool based on coordinates of a reference hole formed at a predetermined position in the reference coordinate system and measurements of the coordinate adjustment unit to determine a spatial coordinate, the reference hole defining a through space with a cylindrical inner peripheral surface parallel to an axis of the reference hole and perpendicularly intersecting a reference surface, the coordinate adjustment unit is insertable in the reference hole, and comprises a first laser measurement device sending out a laser beam in a direction parallel to the reference surface; the orientation adjustment unit comprises a second laser measurement device sending out a laser beam to the reference surface;

setting the adjustment tool in a position to specify two orientation angle coordinates expressing an orientation of the axis of the end effecter based on relative distance between the reference surface and a rotation plane of the orientation adjustment unit being rotated about the axis of the end effecter to determine the two orientation angle coordinates, and adjust the orientation of the end effecter so that a reference side of the end effecter becomes parallel to a predetermined line, and determine orientation angle coordinates of the end effecter about the axis of the end effecter, setting the adjustment tool in a position to equalize the distances against the inner peripheral surface of the reference hole measured by the first laser measurement device, or as to specify spatial coordinates in two directions parallel to the reference surface based on the measurements of the first laser measurement device and the coordinates of the reference hole to thereby determine spatial coordinates in the two directions parallel to the reference surface; and setting the adjustment tool in a position to equalize the distance against the reference surface measured by the second laser measurement device in all the rotational angles of the orientation adjustment unit rotated about the axis of the end effecter, the equalized distance having a predetermined value, or specify spatial coordinates in a direction orthogonal to the reference surface based on measurements of the second laser measurement device and the distance to the reference surface to thereby determine spatial coordinates in the direction orthogonal to the reference surface.

12. The calibration method according to claim 11, further comprising a fourth laser measurement device and a fifth laser measurement device for emitting laser beams in a direction on an XY plane of the reference coordinate system, wherein the setting step includes setting the adjustment tool in such a posture as to allow the reference side surface of the end effecter parallel with the predetermined line based on distances to the reference side surface measured by the fourth and fifth laser measurement devices to thereby determine an orientation of the adjustment tool with respect the axis of the end effecter.

13. The calibration method according to claim 11, wherein a normal direction of the base supported by the support platform is orthogonal to a vertical direction, and a leveler is provided on a reference side surface of the end effecter, and the end effecter is adjusted so that the reference side surface of the end effecter becomes parallel with the predetermined line based on results of the leveler, to thereby determine an orientation angle of the adjustment tool with respect to the axis of the end effecter.

14. The calibration method according to claim 13, wherein in the calculating step, kinematic parameters necessary for the kinematics of the parallel kinematic mechanism are calculated based on the condition that a distance between the joint of the end effecter in the posture and the joint of the base is equal to a sum of the recorded coordinates of each driver shaft connecting the joints with each other and offset coordinates indicative of a shift amount of the origin of each driver shaft.

* * * * *